(12) United States Patent
Wieland et al.

(10) Patent No.: US 10,596,504 B2
(45) Date of Patent: Mar. 24, 2020

(54) FILTERING SYSTEM, PAINTING SYSTEM, AND METHOD FOR OPERATING A FILTERING SYSTEM

(71) Applicant: Dürr Systems AG, Bietigheim-Bissingen (DE)

(72) Inventors: Dietmar Wieland, Waiblingen (DE); Juergen Jost, Asperg (DE); Michael Baitinger, Marbach (DE); Frank Schoettle, Stuttgart (DE); Alexander Hammen, Besigheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 217 days.

(21) Appl. No.: 15/034,141

(22) PCT Filed: Oct. 23, 2014

(86) PCT No.: PCT/EP2014/072797
§ 371 (c)(1),
(2) Date: May 3, 2016

(87) PCT Pub. No.: WO2015/062976
PCT Pub. Date: May 7, 2015

(65) Prior Publication Data
US 2016/0288036 A1 Oct. 6, 2016

(30) Foreign Application Priority Data

Nov. 4, 2013 (DE) .................. 10 2013 222 301
Jul. 10, 2014 (DE) ................. 20 2014 103 177 U

(51) Int. Cl.
*B05B 14/43* (2018.01)
*B01D 46/00* (2006.01)
*B01D 50/00* (2006.01)

(52) U.S. Cl.
CPC ....... *B01D 46/002* (2013.01); *B01D 46/0002* (2013.01); *B01D 46/0013* (2013.01);
(Continued)

(58) Field of Classification Search
CPC ............ B01D 46/0002; B01D 46/0035; B01D 46/0068; B01D 46/0095; B01D 46/002;
(Continued)

(56) References Cited

U.S. PATENT DOCUMENTS

| 3,568,415 A | 3/1971 | Wyrough |
|---|---|---|
| 4,266,955 A | 5/1981 | Hackney |

(Continued)

FOREIGN PATENT DOCUMENTS

| DE | 299 20 041 | 4/2000 |
|---|---|---|
| DE | 20 004 490 | 5/2000 |

(Continued)

OTHER PUBLICATIONS

"Brandschutz Bei Staubfilteranlagen," Aufbereitungs-Technik—Mineral Processing, Bauverlag BV GmbH, DE, Sep. 1, 1999, pp. 462, vol. 40(9). XP000851405.

*Primary Examiner* — Minh Chau T Pham
(74) *Attorney, Agent, or Firm* — Womble Bond Dickinson (US) LLP

(57) ABSTRACT

In order to provide a filter system for separating off contaminants from a stream of untreated gas that contains contaminants that is of simple construction and is operable efficiently, it is proposed that the filter system should include the following: a base construction through which the stream of untreated gas is guidable and which includes at least one filter module receptacle for receiving at least one filter module, and at least one filter module which is selectively arrangeable on and/or in the at least one filter module receptacle and/or removable therefrom, wherein the at least (Continued)

one filter module includes a plurality of filter element receptacles for receiving a plurality of mutually independent filter elements.

16 Claims, 26 Drawing Sheets

(52) U.S. Cl.
CPC ..... *B01D 46/0023* (2013.01); *B01D 46/0093* (2013.01); *B01D 50/002* (2013.01); *B05B 14/43* (2018.02); *B01D 2258/0258* (2013.01); *B01D 2267/00* (2013.01)

(58) Field of Classification Search
CPC ................ B01D 50/02; B01D 46/0023; B01D 46/0013; B01D 46/0093; B01D 2258/0258; B01D 2267/00; B05B 15/1207; B05B 14/43; B27N 3/002
USPC ................ 55/385.1, 318, 342, DIG. 46, 356; 118/309, 326
See application file for complete search history.

(56) References Cited

U.S. PATENT DOCUMENTS

| | | | |
|---|---|---|---|
| 4,498,913 A * | 2/1985 | Tank | B05B 14/43 55/356 |
| 4,590,884 A | 5/1986 | Kreeger et al. | |
| 5,512,100 A | 4/1996 | Ingram et al. | |
| 7,300,483 B2 | 11/2007 | Hauville | |
| 8,241,406 B2 * | 8/2012 | Weschke | B01D 46/0068 118/309 |
| 8,377,177 B2 * | 2/2013 | Holzheimer | B01D 46/0035 95/285 |
| 8,535,420 B2 * | 9/2013 | Holler | B01D 46/0002 95/273 |
| 8,961,642 B2 * | 2/2015 | Holler | B01D 46/0095 55/482 |
| 2003/0059638 A1 * | 3/2003 | Ray | B27N 3/002 428/537.1 |
| 2005/0229560 A1 | 10/2005 | Eder | |
| 2007/0092657 A1 * | 4/2007 | Ferguson | B05B 15/1207 427/421.1 |
| 2010/0197213 A1 | 8/2010 | Holzheimer et al. | |
| 2010/0199912 A1 | 8/2010 | Holzheimer et al. | |
| 2011/0274827 A1 | 11/2011 | Fritz et al. | |
| 2012/0285323 A1 * | 11/2012 | Holler | B01D 46/0002 95/273 |
| 2013/0186049 A1 * | 7/2013 | Holler | B01D 46/0095 55/342 |
| 2014/0202332 A1 * | 7/2014 | Link | B05B 15/1248 95/267 |
| 2014/0366798 A1 * | 12/2014 | Katefidis | B01D 45/08 118/326 |
| 2015/0135955 A1 | 5/2015 | Link et al. | |
| 2016/0023231 A1 | 1/2016 | Schmeinck et al. | |
| 2016/0288036 A1 * | 10/2016 | Wieland | B01D 46/0093 |
| 2018/0207669 A1 * | 7/2018 | Zebisch | B05B 15/65 |
| 2018/0236476 A1 * | 8/2018 | Covizzi | B05B 14/43 |
| 2018/0345307 A1 * | 12/2018 | Schulze | G06Q 10/08 |

FOREIGN PATENT DOCUMENTS

| | | |
|---|---|---|
| DE | 103 61 266 | 7/2005 |
| DE | 10 2013 022 252 | 5/2015 |
| EP | 0 485 087 | 5/1992 |
| EP | 1 086 750 | 3/2001 |
| FR | 2 977 806 | 1/2013 |
| JP | S50-99956 | 8/1975 |
| JP | S56-59121 U | 5/1981 |
| JP | S57-128323 U | 8/1982 |
| JP | S57-197015 | 12/1982 |
| JP | S62-180718 | 8/1987 |
| JP | S63-183078 | 7/1988 |
| JP | H8-10545 | 1/1996 |
| JP | H09-75640 | 3/1997 |
| JP | H10-244115 | 9/1998 |
| JP | H11-285610 | 10/1999 |
| JP | H11-290736 | 10/1999 |
| JP | 2002-204915 | 7/2002 |
| JP | 2009-101314 | 5/2009 |
| JP | 2011-020076 | 3/2011 |
| WO | WO 2004/024341 | 3/2004 |
| WO | WO 2013/083529 | 6/2013 |

* cited by examiner

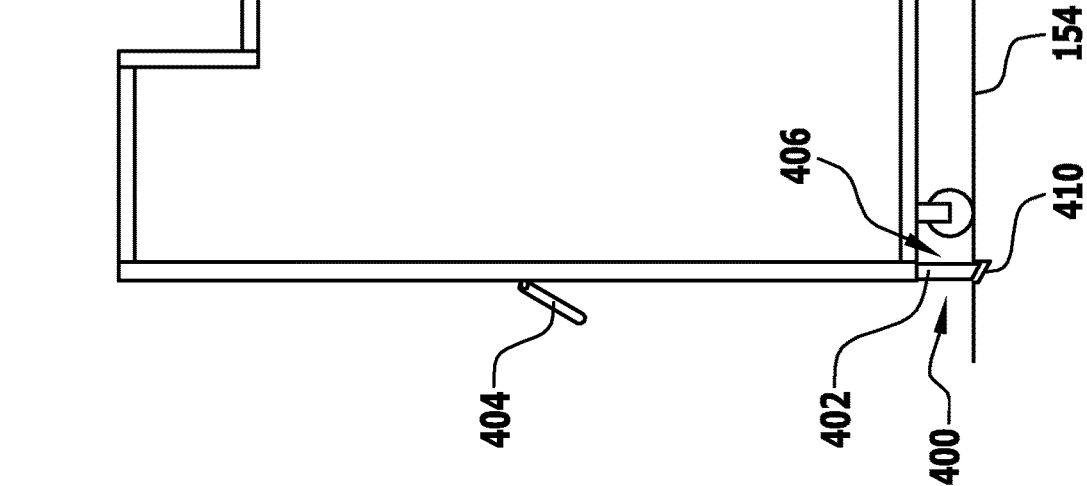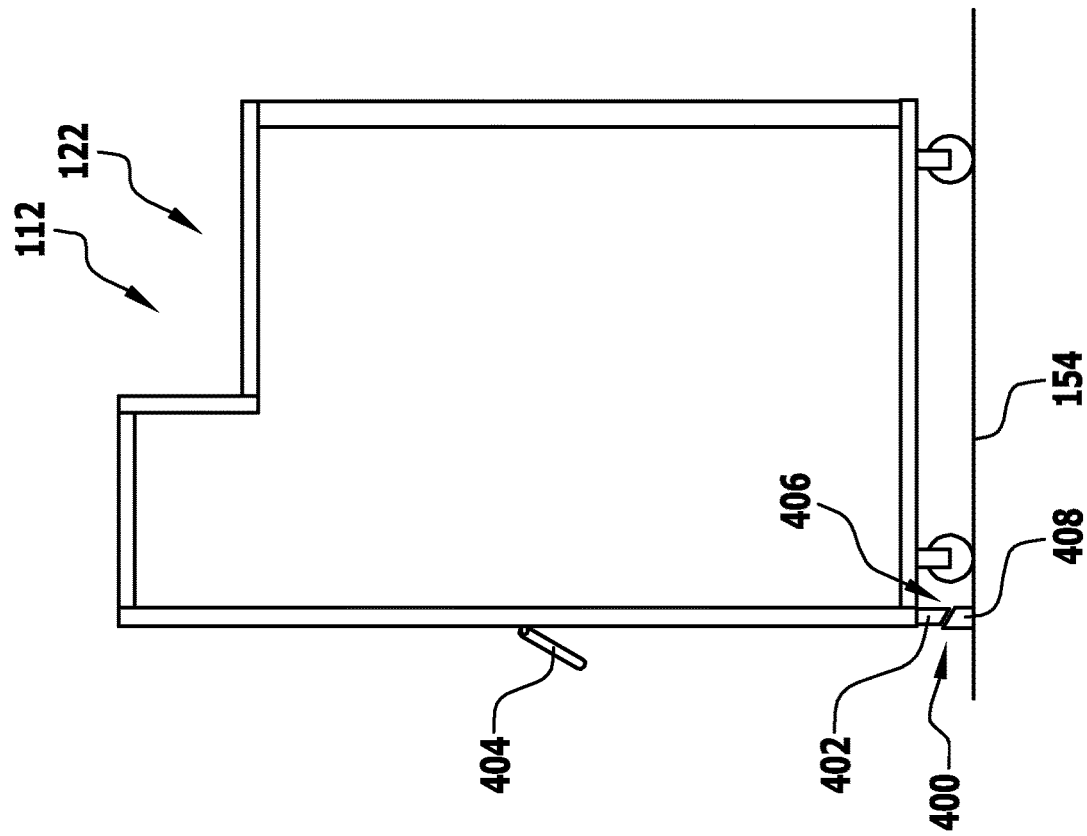

FILTERING SYSTEM, PAINTING SYSTEM, AND METHOD FOR OPERATING A FILTERING SYSTEM

CROSS-REFERENCE TO RELATED APPLICATIONS

This application is a U.S. National Stage filing under 35 U.S.C. 371 of International Patent Application PCT/EP2014/072797, filed on Oct. 23, 2014, and claims priority to German Patent Applications DE 10 2013 222 301.3, filed on Nov. 4, 2013, and DE 20 2014 103 177.4, filed on Jul. 10, 2014. The disclosures of each of the applications noted above are incorporated herein by reference in their entirety.

FIELD OF THE DISCLOSURE

The present invention relates to a filter system for separating off contaminants from a stream of untreated gas that contains contaminants.

BACKGROUND

A filter system of this kind is known for example from WO 2010/069407 A1.

SUMMARY OF THE INVENTION

The object of the present invention is to provide a filter system for separating off contaminants that is of simple construction and is operable efficiently.

This object is achieved according to the invention by a filter system for separating off contaminants from a stream of untreated gas that contains contaminants, wherein the filter system includes the following:
a base construction through which the stream of untreated gas is guidable and which includes at least one filter module receptacle for receiving at least one filter module, and
at least one filter module which is selectively introducible into at least one filter module receptacle or removable therefrom,
wherein the at least one filter module includes a plurality of filter element receptacles for receiving a plurality of mutually independent filter elements.

Because the filter system according to the invention includes a base construction that includes a filter module receptacle for receiving at least one filter module, the filter system can be of simple construction and be usable efficiently. In particular, as a result of this a simple and efficient exchange of filter elements of the filter system may be enabled, as a result of which down times of the filter system that are necessitated by maintenance can be minimised.

In this description, the term "mutually independent filter elements" is to be understood to mean individually and/or mutually independently exchangeable filter elements.

Preferably, there is associated with each filter element a filter element receptacle, with the result that individual filter elements may preferably remain in an installed condition ready for operation while one or more further filter elements are removed from the associated filter element receptacles and replaced by fresh filter elements.

Preferably, a plurality of filter elements are a constituent part of a filter device of the filter module.

In particular, it may be provided for a plurality of filter elements to be a constituent part of a filter device of the filter module and for the stream of untreated gas that is to be cleaned to be flowable through these in mutually parallel manner during a filter operation of the filter system.

It may be favourable if the at least one filter module includes a plurality of filter devices and for the stream of untreated gas that is to be cleaned to be flowable through these one after the other during a filter operation of the filter system.

The filter devices then preferably form a plurality of filter stages that are connected one after the other in a direction of through flow.

In one embodiment of the invention, it is provided for the at least one filter module to include a pre-filter device, a main filter device and/or a post-filter device, and preferably for at least a partial stream of the stream of untreated gas to be flowable through these one after the other during a filter operation of the filter system.

It may be advantageous if the at least one filter module takes the form of a rollable and/or displaceable transport carriage.

A transport carriage of this kind may include for example a roller device, in particular a plurality of transport rollers, by means of which the transport carriage is simply and smoothly displaceable on a floor.

It may be provided for the at least one filter module and/or the at least one filter module receptacle to include a guide device for guiding, moving and/or immobilising the at least one filter module in relation to the at least one filter module receptacle.

The guide device serves in particular for the controlled feeding and/or immobilising of the at least one filter module in a filter position of the filter module, that is to say in a position of the module in which the filter module is arranged during a filter operation of the filter system in order to separate off contaminants from the stream of untreated gas.

The guide device may for example include a rail guide and/or a roller guide.

For example, a telescopic rail guide of the guide device may be provided.

It may be favourable if the at least one filter module is guidable and/or movable, by means of the guide device, from a filter position of the filter module into a change-over position of the filter module, and/or from the change-over position of the filter module into the filter position of the filter module.

In the change-over position of the filter module, in particular an exchange of filter elements of the filter module is possible, for example in order to replace contaminated filter elements with fresh filter elements.

Further, it may be provided, in the change-over position of the filter module, for the entire filter module to be exchangeable for a further filter module.

In particular, it may be provided, in the change-over position, for the filter module to be removable from the guide device and exchangeable for another filter module.

In one embodiment of the invention, it is provided for the base construction to include at least one closable access opening through which an interior space of the at least one filter module receptacle is accessible for introducing and/or removing the at least one filter module from outside the filter system.

In particular, it may be provided for the at least one filter module to be introducible into the at least one filter module receptacle and/or to be removable from the at least one filter module receptacle through the at least one closable access opening.

It may be favourable if each filter module receptacle serves to receive a single filter module.

Further, it may be favourable if an access opening, in particular a separate access opening, is associated with each filter module receptacle.

An access opening may for example be a lockable door, in particular in an outer wall of the base construction of the filter system.

In one embodiment of the invention, it may be provided for the at least one filter module receptacle to include at least one valve device for selectively opening or closing an inlet opening of the filter module receptacle and/or an outlet opening of the filter module receptacle.

Preferably, at least part of the stream of untreated gas is feedable to the filter module receptacle through the inlet opening of the filter module receptacle.

Preferably, a stream of gas, in particular a stream of gas that has been cleaned by means of the filter elements, is guidable away from the filter module receptacle through the outlet opening of the filter module receptacle.

The at least one valve device may for example take the form of a flap or louvre in a wall, in particular a top wall and/or side wall, of a filter module receptacle.

It may be provided for the filter system to include a plurality of filter module receptacles and/or filter modules arranged opposite one another in relation to a vertical longitudinal centre plane of the filter system.

In particular, the filter module receptacles and/or filter modules are preferably arranged and/or constructed to be mirror-symmetrical in relation to the vertical longitudinal centre plane.

Further, it may be provided for the filter system to include a plurality of filter module receptacles and/or filter modules arranged successively in a longitudinal direction of the filter system, in particular in a conveying direction of a conveying device of a painting system.

The filter module receptacles and/or filter modules that are arranged successively in the longitudinal direction of the filter system preferably form a row of filter module receptacles or filter modules that runs parallel to a conveying direction (described below).

The filter module receptacles preferably have closed lateral separating walls that are oriented in particular substantially vertically and substantially perpendicular to the vertical longitudinal centre plane of the filter system, and which fluidically separate from one another interior spaces of filter module receptacles that are arranged successively in the longitudinal direction of the filter system.

Preferably, the filter system includes two rows of filter module receptacles, arranged parallel to one another and parallel to the longitudinal direction, and/or two rows of filter modules, arranged parallel to one another and parallel to the longitudinal direction.

It may be provided for the filter system to include a plurality of filter module receptacles that form flow channels of the filter system which are configured for mutually independent through flow.

The filter system, in particular the filter module receptacles, preferably has valve devices by means of which individual or a plurality of flow channels are blockable or clearable.

Preferably, it is provided for flow through the interior space of individual filter module receptacles to be interruptible by means of the valve devices, in order to enable the at least one filter element and/or at least one filter module that is received in the filter module receptacle to be exchanged without this being adversely affected by the stream of untreated gas.

It may be advantageous if the filter system includes at least one untreated gas shaft that extends between at least two filter module receptacles and through which the stream of untreated gas is guidable, in particular in the substantially vertical direction (direction of gravity), and is feedable to inlet openings in the filter module receptacles.

It may further be provided for the filter system to include at least one clean gas channel that extends between at least two filter module receptacles and through which a stream of clean gas, which is obtainable as a result of separating off contaminants from the stream of untreated gas, is guidable away.

In particular, it may be provided for the filter system to include at least one clean gas collecting channel that extends between at least two filter module receptacles and by means of which a plurality of streams of clean gas from a plurality of filter modules are grouped together and jointly guided away.

An efficient filter system may also be made possible by an efficient exchange of filter elements.

For this reason, the present invention also relates to a filter system for separating off contaminants from a stream of untreated gas that contains contaminants, this filter system including at least one filter element receptacle for receiving at least one filter element and at least one change-over device for automatically exchanging a more pronouncedly contaminated filter element that is arranged in the at least one filter element receptacle for a filter element that is less pronouncedly contaminated.

This filter system further preferably has individual or a plurality of the features and/or advantages that are described in conjunction with the other filter systems described.

In particular, the change-over device described may be used for further development of the other filter systems described.

In this description and the attached claims, the term "pronouncedly contaminated filter element" is to be understood to mean in particular a filter element which has taken up contaminants as a result of the filter operation of the filter system and thus has a high degree of loading or filling, as a result of which a low filtering action, a high resistance to flow, a low mechanical stability of the filter element and/or a high risk of fire may occur.

A less pronouncedly contaminated filter element is in particular a fresh filter element that is not laden with contaminants or is laden with contaminants to only a small extent and can thus be used for an efficient filter operation of the filter system.

For the sake of simplicity of reference, a pronouncedly contaminated filter element or a more pronouncedly contaminated filter element are in general called a "contaminated filter element" below.

A less pronouncedly contaminated filter element, or a filter element that has only low levels of contaminants or none at all, is called a "fresh filter element" below, for the sake of simplicity.

The filter system may include for example one or more change-over devices. In particular, it may be provided for one or more change-over devices to be associated with each row of filter module receptacles and/or filter modules.

It may be advantageous if the change-over device includes a robotic device or takes the form of a robotic device.

It may be favourable if, by means of the change-over device, at least one filter module is movable from a filter position into a change-over position and/or from the change-over position into the filter position.

In one embodiment of the invention, it is provided for a change-over device to be associated with a plurality of filter element receptacles, a plurality of filter modules, a plurality of filter devices and/or a plurality of filter elements, in order if necessary to enable individual or all of the filter elements of these filter devices and/or filter modules to be exchanged.

The change-over device, in particular a robotic device, is for this purpose in particular arranged movably and/or rollably on the filter system.

In this arrangement, the change-over device may for example be arranged on a side with untreated gas and/or on a side with clean gas, that is to say in relation to a direction of flow through the filter modules upstream and/or downstream of the filter modules.

It may be provided for filter elements, in particular if they take the form of disposable filter elements, to be exchangeable by means of the change-over device.

It may be advantageous if the change-over device, in particular the robotic device, is movably suspended on an integrated traversing module (ITM) of the filter system and/or on a painting system (described below).

In particular if the change-over device, for example the robotic device, is arranged on a side of the filter system with untreated gas, it may be provided for the change-over device to include a cover, for example a shrink sleeve and/or a shielding system, by means of which the change-over device can be protected from being contaminated by the contaminants in the stream of untreated gas, in particular paint overspray.

It may be favourable if the change-over device includes one or more receiving devices for receiving fresh or exchanged filter elements. The filter elements may in that case be transported to or away from the filter element receptacles particularly simply by means of the change-over device.

As an alternative or in addition thereto, it may be provided for the change-over device to include a conveying device or for there to be associated with the change-over device a conveying device by means of which fresh filter elements may be transported to the change-over device and/or contaminated filter elements may be transported away from the change-over device.

Preferably, the use of a change-over device, in particular a robotic device, is suitable both in the case of central feeding of the untreated gas (along the vertical longitudinal centre plane), in particular by means of central feeding of booth air, and also in the case of lateral eccentric feeding of untreated gas.

A filter system according to the invention is in particular suitable for use in a painting system for painting workpieces, in particular vehicle bodies.

Thus, the present invention also relates to a painting system for painting workpieces, in particular vehicle bodies, which includes at least one filter system according to the invention.

The painting system according to the invention preferably has individual or a plurality of the features and/or advantages described in conjunction with a filter system.

The present invention further relates to a method for separating off contaminants from a stream of untreated gas that contains contaminants by means of a filter system.

In this regard, the object of the invention is to provide a method that is operable simply and efficiently.

This object is achieved according to the invention in that the method for separating off contaminants from a stream of untreated gas that contains contaminants by means of a filter system includes the following:

feeding the stream of untreated gas to a plurality of filter elements that are arranged in filter element receptacles of a filter module, wherein the filter module is arranged in a filter module receptacle of the filter system;

separating off contaminants from the stream of untreated gas at the filter elements;

removing the filter module from the filter module receptacle;

exchanging one or more of the more pronouncedly contaminated filter elements arranged in the filter element receptacles for one or more less pronouncedly contaminated filter elements;

introducing the filter module into the filter module receptacle.

The method according to the invention preferably has individual or a plurality of the features and/or advantages described in conjunction with the filter system according to the invention and/or the painting system according to the invention.

Further, the object is achieved in that a method for separating off contaminants from a stream of untreated gas that contains contaminants includes the following:

feeding the stream of untreated gas to at least one filter element;

separating off contaminants from the stream of untreated gas at the at least one filter element, as a result of which the at least one filter element is contaminated;

exchanging the at least one contaminated filter element for a fresh filter element by means of an automatic change-over device.

This method preferably has individual or a plurality of the features and/or advantages described in conjunction with the method according to the invention and/or the filter system according to the invention and/or the painting system according to the invention.

Further, the filter system according to the invention, the painting system according to the invention and/or the method according to the invention may have individual or a plurality of the features and/or advantages described below:

It may be provided for one or more filter elements to take the form of so-called disposable filter elements.

For example, it may be provided in this arrangement for a hollow body, in particular made from a non-metallic material, to be provided in which walls that succeed one another in the direction of an incoming stream of air (stream of untreated gas) have openings that become smaller in the direction of through flow. In particular, it may be provided for a pre-filter device to be formed by means of at least one filter element of this kind.

Further, it may be provided for at least one filter element to include a plurality of separating elements that are arranged such that a flow labyrinth is formed. The separating elements are preferably permeable when there is a small load (level of contamination) such that the separating elements may serve as a separating filter (depth filter). In the event of heavier load (level of contamination) of the separating elements, the filter element serves in particular as an inertial filter.

At least one filter element may for example include a fibre material and/or a nonwoven material or be formed by a fibre material and/or a nonwoven material.

It may be favourable if at least one filter element takes the form of a disposable element, for example a recyclable disposable element. For example, it may be provided for at least one filter element to be made from recycling material with wet strength and, for re-use, to be processible to again give recycling material with wet strength.

The filter system may preferably have at least two, in particular three or four, filter stages, that is to say filter devices that are arranged one after the other in relation to a direction of flow.

Preferably, a pre-filter device, a main filter device, a post-filter device and/or a safety filter device (additional filter device; policing filter device) are provided.

The safety filter device is preferably integrated fixed within the base construction, while the pre-filter device, main filter device and/or post-filter device are preferably arranged in movable filter modules.

The filter modules are preferably covered, in particular by means of top walls of the filter module receptacles. In this way it is possible to prevent contamination that drips down or falls from a paint spray booth of the painting system, in particular paint and/or solvent, from contaminating the filter modules.

It may be favourable if the filter module receptacle and/or the filter module include a bypass device for a pre-filter device.

In this way, preferably selectively, in particular in a manner adjustable by means of a valve device (flap device), a stream of untreated gas may first be guided through the pre-filter device or past the pre-filter device before being fed to the main filter device.

It may be advantageous if the bypass device is arranged in an edge region of the filter system, such that only slightly contaminated untreated gas is feedable through the bypass device of the main filter device.

More pronouncedly contaminated untreated gas, in particular in a central region, such as the region of the vertical longitudinal centre plane of the filter system and/or the painting system, is preferably guided through the pre-filter device and only thereafter fed to the main filter device.

It may be provided for the at least one filter module, in particular a filter module that takes the form of a transport carriage, to include a catching element, for example a catching trough by means of which contamination falling from the filter elements is catchable. This preferably makes it possible to prevent a floor of the filter system from becoming undesirably contaminated.

For the transport of one or more filter modules, a transport device may preferably be provided.

For example, the transport device may take the form of a lifting truck.

It may be favourable if the transport device, in particular the lifting truck, includes one or more catching elements, in particular catching troughs, for catching contamination falling from the filter elements.

It may be favourable if the filter module is fixable on the transport device by means of a securing device, in particular in order to prevent the filter module from tilting during transport thereof.

Further, it may be provided for a change-over—in particular an automatic change-over—of individual filter elements to be carried out directly in the filter system. The filter module may then in particular be stationary.

Sealing the filter module with respect to the filter module receptacle and/or the base construction is preferably performed by means of one or more flange connections, for example by means of one or more angled flanges.

In particular, an angled flange having a substantially P-shaped cross section, which for the purpose of sealing is pressable against a sealing element, in particular a foam rubber element, may be provided.

Preferably, for sealing with respect to the filter module receptacle, the filter module is pushed against one or more flanges and is immobilised in this position.

A contact pressure force that is required for sealing is preferably applied by means of a guide device, in particular a telescopic rail-type device.

As an alternative or in addition thereto, it may be provided, for the purpose of sealing the flange connection, for the filter module to be immobilised in a desired filter position by means of an immobilising device. An immobilising device of this kind (locking arrangement) may for example be made by embossing or impression on a booth wall, in particular a side wall of the filter module receptacle.

To determine a change-over time of at least one filter element, a statistical evaluation may be used. For example, the detection of overspray in a painting device may be used to infer the extent by which the filter elements have been laden in different regions of the filter system and hence to determine the change-over time.

As an alternative or in addition thereto, the number of painted workpieces, in particular vehicle bodies, may be determined for example by means of a skid counter in order to infer the extent by which individual filter elements or individual filter modules have been laden.

Further, it is possible to infer from the detection of volumetric flow, for example by means of a pressure measurement, a measurement orifice and/or a hot wire, the level of filling (level of load; degree of contamination) of the filter elements.

It is also conceivable to evaluate the mass, in particular the weight, of the filter modules in order to infer a change-over time.

A filter module may preferably be moved from the filter position into the change-over position by way of the side with clean gas and/or the side with untreated gas thereof.

In the filter position of the filter module, the latter is preferably sealed with respect to the filter module receptacle on an input side and/or on an output side by means of a flange connection.

The filter modules and/or the filter module receptacles are preferably arranged above, in particular directly over, safety filter devices or additional filter devices.

However, it may also be provided for the filter modules and/or the filter module receptacles to be arranged below, in particular directly underneath, safety filter devices or additional filter devices.

In particular if the filter modules and filter module receptacles are arranged on a floor on which the entire filter system and/or painting system is constructed, the maximum bearing capacity that is to be taken up by the base construction and hence the base construction may be structured in a simpler manner and at lower cost. In particular, as a result of this a walkway that is arranged above this floor, or a further floor formed by means of the base construction, may be designed for a lower weight.

It may be provided for flow through the filter modules to be in at least one direction running perpendicular to the vertical longitudinal centre plane of the filter system.

As an alternative or in addition thereto, it may be provided for flow through the filter modules to be in at least one direction running parallel to the vertical longitudinal centre plane.

The directions of through flow are in this arrangement preferably oriented substantially horizontally or vertically.

A filter element of a pre-filter device preferably takes the form of an inertial filter having a single or multiple deflection points. The filter element may be formed for example from cardboard, synthetic material, ceramic and/or metal or include cardboard, synthetic material, ceramic and/or metal. In particular, the filter element is formed from recycling material.

It may be advantageous if a filter element of a pre-filter device has at least approximately the same dimensions in the horizontal direction as the main filter device.

In particular, it may be provided for a hollow body, for example a frame, of the main filter device to be used for receiving and/or constructing the pre-filter device. Preferably in that case all that needs to be done is to insert the filter elements of the pre-filter device therein.

The main filter device preferably includes one or more filter elements that are formed from cardboard, paper, synthetic material, ceramic and/or metal or include cardboard, paper, synthetic material, ceramic and/or metal.

In particular, at least one filter element of the main filter device is formed partly or entirely from disposable material, recycled material and/or recyclable material.

At least one filter element of the main filter device is preferably an inertial separator, wherein in particular a plurality of segments that are arranged one after the other in the direction of flow are provided and are exchangeable substantially independently of one another, such that in particular segments arranged upstream, which are more pronouncedly dirty, may be changed more frequently than the segments arranged downstream.

One or more filter elements of the post-filter device preferably include a fibre material and/or a nonwoven material, for example in the form of a mat filter.

In particular if an air recirculating operation is provided in the painting system, an additional filter device and/or safety filter device (policing filter) may be provided.

Filter elements of the safety filter device and/or additional filter device are preferably bag filter elements or cartridge filter elements.

It may be favourable if walls are formed between the filter modules as fire protection walls.

In the event of a fire, an inlet opening on the wall side of a filter module receptacle and/or filter module may preferably be closed for example by way of a flap.

Further, in the event of a fire, a flap on the exhaust air side of a filter module receptacle and/or filter module may preferably be closed.

In particular if an untreated gas shaft is provided by means of which the stream of untreated gas is guided, centrally in the filter system, along the vertical longitudinal centre plane, it may be provided for fire protection reasons for the untreated gas shaft to be closable by means of a slide or flap.

In particular, as a result of this preferably an inlet of the filter module receptacles and/or filter modules may be closed.

Preferably, the filter system has a segment-type construction.

It may be provided for individual sections of the untreated gas shaft to be coverable or closable. In particular in the event of a filter element change-over and/or filter module change-over, the region of the untreated gas shaft adjoining the filter element and/or filter module to be changed may then preferably be covered or closed in order to prevent or at least to reduce undesirable contamination during the change-over procedure.

It may be provided for contaminated filter elements to be removed at a change-over station and for example to be fed to a collecting vessel by way of a chute or an opening on the work level.

The collecting vessel may for example take the form of a collecting and/or pressing container in order to enable a multiplicity of contaminated filter elements to be received.

Preferably, at the change-over station new, empty, partly filled, prepared and/or fresh filter elements are fed, in particular being introduced into the filter element receptacles.

The change-over station is for example the region in which at least one filter module is arranged when the latter is in the change-over position.

However, it may also be provided for the change-over station to be a position to which the at least one filter module is transportable by means of the transport device.

It may be provided for the filter elements, in particular the contaminated filter elements, to be packed before they are pressed, in particular in the pressing container, for example using a sack of synthetic material. In this way, the collecting and/or pressing container can be prevented from becoming dirty.

In particular if the filter elements or filter modules have different degrees of contamination (levels of load), undesirable flows, in particular longitudinal flows, may arise in the filter system and/or the paint spray booth of the painting system. Undesirable flows of this kind may for example be reduced or prevented as follows:

A valve device (flap) on the exhaust air side of the filter module or the filter module receptacle preferably compensates for the loss of pressure in the filter module, which increases as the level of contamination increases, by opening further. By means of the valve device, which serves in particular as a throttle, it is thus preferably possible to keep an overall pressure loss constant by altering the degree of throttle (flap position).

The valve device may be adjusted, in particular being opened and/or closed, preferably in steps or continuously, in particular in dependence on a level of load of the filter elements and/or the filter module. For determining the level of load and thus the opening of the valve device, preferably use is made of the measures for determining the change-over time for the filter elements.

As an alternative or in addition thereto, it may be provided for the stream of gas flowing through the filter module receptacle to be accelerated by means of a ventilator device, in particular a fan, for example an axial fan and/or a radial fan, in particular directly at an output side of the filter module receptacle. In particular, the ventilator device may compensate for the loss in pressure, which increases as the level of load increases.

In particular, the ventilator device is adjusted such that the volumetric flow of the stream of gas guided through the filter module receptacle and/or the filter module is always substantially constant.

For controlling and/or regulating the performance of the ventilator device, use may preferably be made of the measures for determining the change-over time for the filter elements.

In particular for automating the filter system, it may be provided for individual or a plurality of elements or modules, in particular filter elements and/or filter modules, to be movable and/or rollable mechanically.

For example, it may be provided for the filter modules to be movable mechanically by means of a guide device. For this purpose, the guide device preferably includes a drive device, for example a pneumatic cylinder or hydraulic cylinder.

For transporting the filter modules, in particular for removing and/or feeding the filter modules from or to a receiving position (change-over position) of the guide device, for example an overhead conveyor and/or a driverless transport system, in particular a driverless floor-mounted transport system, may be provided.

It may be favourable if at least one filter module receptacle is arranged on an outer wall of the filter system, in particular an outer wall of the base construction of the filter system, and/or is integrated in the outer wall of the filter system, in particular in the outer wall of the base construction of the filter system.

In this arrangement, it may be provided for at least one filter module to be arrangeable on the at least one filter module receptacle, by bringing the at least one filter module into abutment against the outer wall.

For example, it may be provided for a filter module to be abuttable flat against the outer wall.

Preferably, the filter module receptacle, in particular the outer wall, and the filter module each include an inlet opening and an outlet opening.

Preferably, by bringing the filter module into abutment against the outer wall, an inlet opening of the filter module and an outlet opening of the filter module are abuttable in fitting manner against a corresponding inlet opening and a corresponding outlet opening in the outer wall.

A seal between the outer wall and the filter module is preferably made by means of one or two flanges or flange regions.

Preferably, a stream of gas flows through a housing, in particular a closed housing, of a filter module, preferably without flowing around the filter module itself.

The outer wall of the filter system, in particular the outer wall of the base construction of the filter system, preferably has one or more recesses in which one or more filter modules are arrangeable.

Preferably, two recesses which are arranged opposite one another in relation to the vertical longitudinal centre plane of the filter system and are constructed to be substantially mirror-symmetrical to one another are provided in the outer walls of the filter system that are arranged opposite one another in relation to the vertical longitudinal centre plane.

The recesses preferably extend in a conveying direction of a conveying device of the painting system.

Preferably, a plurality of filter modules are receivable in one recess.

Doors and/or intermediate walls between individual filter modules are preferably dispensable.

It may be provided for a filter module to include a housing which includes an access opening, for example a door.

The access opening, in particular the door, is for example arranged in a rear side of the housing of the filter module.

The rear side is in particular a side of the housing of the filter module that, during filter operation of the filter system, is accessible from an area surrounding the filter system.

In particular, the rear side is a side that is remote from a front side of the filter module, wherein the front side is preferably the side of the housing of the filter module in which an inlet opening and/or an outlet opening of the filter module are arranged.

The front side is in particular the side of the filter module by means of which the filter module is arrangeable on the filter module receptacle.

In particular for changing individual or a plurality of filter elements of filter devices of a filter module, it may be provided for these filter elements to be accessible through an access opening, in particular a door, in the housing of the filter module.

As an alternative or in addition thereto, it may be provided for the housing parts of the housing of the filter module to be removable.

Further, as an alternative or in addition thereto, it may be provided for filter elements, for example a post-filter element of a post-filter device, to take the form of insertable elements for insertion, in particular laterally, into the filter module.

It may be advantageous if the main filter device and/or the post-filter device are constructed such that a post-filter device, in particular one or more filter elements of the post-filter device, are accessible and/or exchangeable through the main filter device if the main filter device is at least partly demounted.

Despite a smaller number of walls, in particular intermediate walls between individual filter modules, the rate at which fire is propagated may preferably be kept low.

Moving components, in particular a guide device of the filter system, are preferably arranged outside a region through which a stream of gas flows during operation of the filter system. As a result of this, the filter system may be of robust construction and may be operated reliably.

Preferably, as a result of the abutment of filter modules against outer walls of the filter system, more filter modules are usable than if, over the same length of the filter system, a separate filter module receptacle for each filter module were provided for receiving the filter module in a separate interior space. As a result, the filter modules may preferably be placed closer to one another. As a result, preferably a filter surface area may be made larger and/or a filter service life may be made longer.

Moreover, preferably the space requirement for changing filter modules and/or filter elements may be made smaller.

In one embodiment of the invention, it may be provided for one or more inlet openings of a filter module receptacle and/or one or more inlet openings of a filter module to be arranged below in relation to the direction of gravity, in particular directly underneath, one or more outlet openings of the filter module receptacle and/or one or more outlet openings of the filter module.

As an alternative or in addition thereto, it may be provided for one or more inlet openings of a filter module receptacle and/or one or more inlet openings of a filter module to be arranged above in relation to the direction of gravity, in particular directly over, one or more outlet openings of the filter module receptacle and/or one or more outlet openings of the filter module.

It may be provided for one or more inlet openings on the one hand and one or more outlet openings on the other to be arranged in the same wall, for example a front side of a filter module, or in mutually different walls.

As an alternative or in addition, the object of the present invention is achieved in that the filter system for separating off contaminants from a stream of untreated gas that contains contaminants includes the following:
a base construction through which the stream of untreated gas is guidable;
a fire protection device by means of which a fire in the filter system is preventable, containable and/or extinguishable, wherein the fire protection device includes one or more fire protection elements for affecting propagation of the flames.

In this description and the attached claims, the term "fire" is to be understood to mean in particular a fire that causes damage.

A fire protection element may for example be an intermediate wall between two or more filter elements or filter modules of the filter system. A fire protection element of this kind is in particular a fire protection wall.

One or more fire protection elements may for example be a part or constituent part of one or more filter elements or one or more filter modules.

A fire protection element is for example a section of a filter module, a filter module receptacle, a filter element and/or a filter element receptacle.

For example, it may be provided for a fire protection element to be a section of a housing and/or a wall of a filter module, a filter module receptacle, a filter element and/or a filter element receptacle.

The filter system that includes a fire protection device preferably has individual or a plurality of features and/or advantages of the filter systems that include at least one filter module.

It may be favourable if the fire protection device includes one or more fire protection elements that are actuable in the event of a fire.

In particular, it may be provided for the fire protection device to include one or more fire protection elements that are movable in the event of a fire, in particular being introducible into a flow path or a path of fire propagation or removable therefrom.

It may be provided for one or more fire protection elements to include a fire-retardant material or to be formed from a fire-retardant material.

A fire-retardant material may for example include a metal material and/or a ceramic material or be a metal material and/or a ceramic material.

A fire-retardant material is in particular a material which, under the standard DIN 4102, in the event of a fire enables functionality to be maintained for at least approximately 30 minutes (fire resistance class F30, W30, T30), in particular at least approximately 60 minutes (fire resistance class F60, W60, T60), for example at least approximately 90 minutes (fire resistance class F90, W90, T90).

As an alternative or in addition thereto, it may be provided for one or more fire protection elements to include a material or to be formed from a material which, under the effect of heat and/or in contact with a reagent, is disintegrable, liquefiable and/or combustible.

A material of this kind preferably has a low melting point, a low resistance to fire, a low chemical stability and/or a low physical resistance, in particular with reference to further constituent parts and/or structural parts of the filter system.

A material which, under the effect of heat and/or in contact with a reagent, is disintegrable, liquefiable and/or combustible, is for example a foil, fusible link, cardboard or similar.

It may be favourable if one or more fire protection elements include a material or are formed from a material that is removable under the effect of heat, such that in particular a passageway (extinguishing opening) is clearable.

As an alternative or in addition thereto, it may be provided for one or more fire protection elements to be constructed and/or arranged such that under the effect of force, in particular by applying a load and/or pressure, the one or more fire protection elements are removable and/or destructible.

A material which, under the effect of heat, is disintegrable, liquefiable and/or combustible, is preferably a material which in the event of a fire ensures that functionality is maintained for less than a minute.

It may be provided for the one or more fire protection elements to be arranged, in an initial position, on one or more receptacles for one or more fire protection elements.

By comparison with a material of the one or more receptacles, the material of the one or more fire protection elements preferably has a lower melting point, a lower fire resistance (fire resistance class) and/or a lower chemical stability and/or physical resistance.

It may be favourable if, under the effect of heat and/or in contact with a reagent and/or under the effect of a force, one or more fire protection elements are removable, in particular without removing, deforming or in any other way affecting the one or more receptacles for receiving the one or more fire protection elements.

The one or more receptacles are in particular a constituent part of the filter system, for example sections of a housing and/or a wall of a filter module, a filter module receptacle, a filter element and/or a filter element receptacle.

The one or more receptacles are for example formed from a metal material or include a metal material.

The one or more receptacles are preferably stabilisation devices for mechanically stabilising one or more fire protection elements in normal operation (filter operation) of the filter system.

For example, it may be provided for a receptacle to include a grating or to be formed by a grating against which one or more fire protection elements abut or are abuttable.

Normal operation of the filter system is in particular a filter operation of the filter system in which contaminants are separated off from a stream of untreated gas that contains contaminants by means of the filter system. In normal operation of the filter system, the latter is in particular operable without being impaired.

A distinction should preferably be made between this and an operation or condition of the filter system in which a fire is present. In the event of such a fire, the filter system is damaged by a fire or at least operation of the filter system is impaired by a fire.

The one or more receptacles for the one or more fire protection elements are preferably formed from a material which provides a fire resistance class of at least F30, W30, T30, preferably at least F60, W60, T60, for example at least F90, W90, T90.

In one embodiment of the invention, it may be provided for one or more extinguishing openings in the filter system to be clearable in the event of a fire by means of one or more fire protection elements.

In particular, it may be provided for one or more extinguishing openings of one or more filter elements, one or more filter element receptacles, one or more filter modules and/or one or more filter module receptacles to be clearable.

The one or more extinguishing openings of the filter system are for example cutouts or apertures in one or more walls of the filter system. The cutouts or apertures are preferably closed in normal operation of the filter system by means of one or more fire protection elements.

It may be favourable if one or more receptacles for the one or more fire protection elements include or form one or more extinguishing openings which are closed in normal operation of the filter system by means of one or more fire protection elements.

The filter system preferably includes one or more filter elements and/or one or more filter modules whereof the interior space is accessible from outside in the event of a fire, by removing one or more fire protection elements.

In particular, it may be provided, under the effect of heat and/or in contact with a reagent and/or under the effect of a force, for the one or more fire protection elements to be removable such that the interior space of the one or more filter elements and/or the interior space of the one or more filter modules is accessible from outside.

It may be favourable if the fire protection device includes an application device by means of which an extinguishing material and/or a reagent is dischargeable.

In particular, it may be provided for an extinguishing material to be dischargeable by means of the application device onto elements and/or regions of the filter system that are burning or are at risk of burning.

As an alternative or in addition thereto, it may be provided for an extinguishing material and/or a reagent to be dischargeable by means of the application device onto one or more fire protection elements.

The application device is for example a sprinkler device.

Preferably, a liquid, foam or powder extinguishing material is dischargeable by means of the application device.

As an alternative or in addition thereto, it may be provided for a liquid, foam or powder reagent to be dischargeable by means of the application device.

It may be provided for the application device to be constructed and/or arranged such that, when extinguishing material and/or reagent flows out, the extinguishing material and/or reagent flows out in the direction of the one or more fire protection elements and strikes the one or more fire protection elements.

In one embodiment of the invention, it may be provided, in the event of a fire, for extinguishing material and/or reagent to be dischargeable by means of the application device through one or more extinguishing openings in the filter system and into an interior space of the filter system, in particular once one or more fire protection elements have been removed for clearing one or more extinguishing openings.

The extinguishing material and/or reagent is preferably dischargeable into an interior space in one or more filter elements and/or into an interior space in one or more filter modules.

It may be favourable if the application device is arranged outside an interior space of the filter system, in particular outside an untreated gas space of the filter system and/or outside a clean gas space of the filter system. As a result of this, the application device may preferably be kept free of contamination contained in the stream of untreated gas.

The application device may for example be arranged directly over, laterally offset above or laterally next to one or more filter elements and/or one or more filter modules of the filter system.

It may be advantageous if the filter system includes one or more filter modules that take the form of rollable or displaceable transport carriages.

A wall of the one or more transport carriages preferably includes one or more extinguishing openings which, in normal operation of the filter system, are closed by means of one or more fire protection elements.

The one or more extinguishing openings are for example arranged on an upper side or rear side (back, back wall) of the transport carriage.

In particular, it may be provided for the filter system to include at least one filter module receptacle which is arranged on an outer wall of a base construction of the filter system and/or is integrated in the outer wall of the base construction. At least one filter module is preferably arranged or arrangeable by being brought into abutment against the outer wall of the at least one filter module receptacle. One or more extinguishing openings are then arranged for example on or in the outer wall of the base construction. As an alternative or in addition thereto, it may be provided for one or more extinguishing openings to be arranged on or in a rear side (back wall) of the at least one filter module, which is remote from the outer wall.

In one embodiment of the invention, it may be provided for the filter system to include one or more filter modules which take the form of rollable or displaceable transport carriages. A wall of the one or more transport carriages preferably includes one or more extinguishing openings which, in normal operation of the filter system, are closed by means of one or more fire protection elements.

In particular, it may be provided for one or more top walls and/or side walls, in particular one or more back walls (rear sides), of the one or more transport carriages to include one or more extinguishing openings which, in normal operation of the filter system, are closed by one or more fire protection elements.

The filter system described above is suitable in particular for use in a painting system.

The present invention thus also relates to a painting system for painting workpieces, in particular vehicle bodies, which in particular includes one or more filter systems according to the invention.

The present invention further relates to a method for operating a filter system for separating off contaminants from a stream of untreated gas that contains contaminants.

In particular, the invention relates to a method for operating a filter system according to the invention.

Preferably, in the method according to the invention there is provided the following: activation of a fire protection device for preventing, containing and/or extinguishing a fire in the filter system, wherein the propagation of flames is affected by means of one or more fire protection elements of the fire protection device.

The method according to the invention further preferably has individual or a plurality of features and/or advantages that are described in conjunction with the filter systems according to the invention and/or the painting systems according to the invention and/or the method for separating off contaminants.

It may be favourable if, by means of one or more fire protection elements, in the event of a fire one or more extinguishing openings of the filter system are cleared.

Thus, in the case of the method preferably one or more fire protection elements are at first arranged such that one or more extinguishing openings of the filter system are covered or closed. For clearing one or more extinguishing openings, the one or more fire protection elements are preferably removed.

Further, the filter systems, the painting systems and/or the methods may have individual or a plurality of the features and/or advantages described below:

By means of one or more fire protection elements, which are in particular formed from a fire-retardant material, it is preferably possible to reduce a rate of propagation of fire (rate of flame propagation) and/or to prevent or at least slow the spread of fire from burning filter elements and/or filter modules to further filter elements and/or filter modules.

A material which, under the effect of heat and/or in contact with a reagent, is disintegrable, liquefiable and/or combustible, is for example a fusible material.

It may be advantageous if one or more filter modules include a frame formed from profile structural parts, in particular aluminium profiles.

Surface structural parts of a filter module are preferably metal panels, for example aluminium panels or aluminium composite panels.

In particular, it may be provided for a filter module to include a frame made from aluminium profiles and walls formed from aluminium panels or aluminium composite panels. In this way, a filter module may be produced quickly and simply.

A filter module is in particular abuttable, pressable and/or placeable against an outer wall of the filter system.

A seal may be made between a filter module and a filter module receptacle for example by means of a sealing strip, in particular a rubber sealing strip. A sealing strip or other kind of seal may for example be arranged on the filter module and/or the filter module receptacle.

Preferably, a seal is made between a filter module and a filter module receptacle by pressing a sealing element or other kind of seal, for example a sealing strip, against a planar surface.

As an alternative thereto, it may be provided for one or more respective sealing elements, for example edge-protecting sealing strips or rubber clamping strips, to be provided both on the filter module and also on the filter module receptacle.

It may be favourable if the filter system includes an immobilising device for immobilising one or more filter modules on one or more filter module receptacles.

The immobilising device may for example include one or more immobilising elements, in particular one or more shoot bolt rods.

The immobilising element is preferably engageable with a projection and/or a recess which is arranged for example in a floor.

Preferably, the immobilising device includes one or more oblique faces such that when the immobilising device is engaged with a projection and/or a recess a clamping action can be produced. For example, it may be provided, by means of one or more oblique faces, for a filter module to be pressable against a filter module receptacle and/or to be immobilised in this position by means of the immobilising element of the immobilising device.

The immobilising device may for example have one immobilising element, two immobilising elements or more than two immobilising elements per filter module.

An immobilising device which serves in particular as a locking device is preferably used when one or more filter elements are abuttable or arrangeable on an outer wall of the filter system. By using filter modules of this kind and/or the associated immobilising device, it is possible in particular to produce good accessibility for the filter modules on the one hand, but also secure fixing of the filter modules on the filter module receptacles on the other.

The immobilising device may further take the form for example of a doorstop, for example a doorstop that is lowerable into the floor. In this way too, a filter module may be fixed on the filter module receptacle simply and reliably.

By means of the immobilising device, the filter module is preferably lockable, and/or fixable in a predetermined position, and is preferably also pressable against the filter module receptacle for producing a contact pressure force at a seal.

In one embodiment of the invention, it may be provided for the filter system, in particular a filter module and/or a filter module receptacle, to include an actuating device for actuating one or more valve devices.

An actuating device of this kind includes in particular an actuating lever which is coupled to one or more flap elements of the valve device.

By actuating the actuating lever, the one or more flap elements of the valve device are preferably movable from an open position into a closed position or from a closed position into an open position.

Preferably, the actuating device includes a restoring device, for example a spring, by means of which the actuating lever and/or the one or more flap elements of the valve device are automatically moved into a closed position in the absence of actuation of the actuating lever.

Preferably, the actuating device further includes a limit stop and/or a slot guide which is for example arranged on a filter module and serves to actuate the actuating lever.

The actuating lever and the entire valve device are then preferably arranged on a filter module receptacle.

However, it may also be provided for the valve device and the actuating lever of the actuating device to be arranged on a filter module. The limit stop and/or the slot guide for actuating the actuating lever are then preferably arranged on the filter module receptacle.

The valve device is in particular a flap for closing off a clean gas channel from an area surrounding the filter system.

A valve device is preferably arranged directly downstream of the filter module.

The valve device is preferably actuable mechanically by bringing the filter module closer to the filter module receptacle, in particular such that flap elements of the valve device are opened.

When the filter module is moved away from the filter module receptacle, the flap elements of the valve device are preferably closed automatically.

The opening procedure and/or closing procedure may preferably be triggered by means of the limit stop and/or a slot guide.

For ensuring constant painting conditions in the painting system, preferably a volumetric flow in the painting zones is kept constant. Usually, as the duration of use of a filter module lengthens, a difference in pressure brought about by the contamination that hinders flow through the filter elements increases.

During operation of the filter module, in particular beyond an overall duration of operation, a volumetric flow of the stream of gas flowing through a filter module is preferably measured and/or regulated continuously. For example, the volumetric flow may be determined by measuring the difference in pressure and/or by means of a Pitot tube, a flywheel and/or a hot wire.

As a result of increasing difference in pressure, the volumetric flow falls as the duration of operation continues.

Preferably, for adapting volumetric flow, a speed of rotation and/or the output of a ventilator and/or fan is controlled and/or regulated.

For example, it may be provided for a rotational speed of a ventilator to be continuously increased as the filter elements increasingly fill with contamination and as the difference in pressure concomitantly increases.

By determining the speed of rotation of the ventilator impeller, a change-over time for changing one or more filter elements of a filter module may preferably be determined. For example, it may be provided for one or more filter elements and/or filter modules to be exchanged when a defined rotational speed limit value is reached. In particular, individual filter modules and/or filter elements of a filter module of one or more painting zones of the painting system may be exchanged.

It may be favourable if the filter system includes one or more filter modules and a collecting channel.

Preferably, a stream of clean gas obtainable by cleaning the stream of untreated gas is feedable to the collecting channel from the one or more filter modules.

It may be favourable if the collecting channel is arranged above the one or more filter modules.

In particular, the collecting channel is arranged directly over the one or more filter modules.

The collecting channel and the one or more filter modules are thus preferably arranged to succeed one another in the vertical direction.

In this arrangement, the filter system preferably has a one-sided filter module arrangement, in which all the filter modules are arranged on a single side of a central untreated gas shaft.

The one or more filter modules are preferably movable on a floor on which the entire filter system is arranged. This floor is in particular a factory floor that is preferably designed for very heavy loads.

An inlet opening of a filter module may for example be below an outlet opening, such that a stream of clean gas that has been cleaned by means of the filter module can leave the filter module upwards.

A collecting channel is preferably arranged above the outlet openings of the filter modules and serves in particular to guide away clean gas from all the filter modules.

In an alternative embodiment, it may be provided for the filter modules to be arranged on one side and the collecting channel on the other side, on opposite sides of the central untreated gas shaft.

In that case, the filter system preferably includes one or more clean gas channels by means of which clean gas is guidable away from the filter modules and is feedable to the collecting channel.

In this arrangement, the one or more clean gas channels preferably intersect the untreated gas shaft and in particular have untreated gas flowing around them during operation of the filter system.

In this arrangement, the clean gas channels are in particular arranged above inflow openings of the filter modules.

The clean gas channel is preferably arranged, in respect of the vertical direction, at least approximately at the same level as the filter modules.

Clean gas channels that intersect the untreated gas shaft may also be called spur lines.

All the statements regarding a side and/or the central arrangement of the untreated gas shaft relate to a cross section of the filter system and/or the painting system that is perpendicular to a conveying direction of the conveying device.

It may be advantageous if the filter system includes one or more filter modules that include a pre-separating device.

The pre-separating device preferably includes one or more separating elements which have for example an I-shaped and/or double T-shaped cross section.

Preferably, one or more separating elements of the pre-separating device are arranged offset from one another and/or nested inside one another.

The pre-separating device preferably serves to deflect, one or more times, the flow of a stream of untreated gas that is flowing into a filter module. In this way, it is possible in particular for large and hence slow-moving contamination to impact against the separating elements of the pre-separating device and thus to be separated off from the stream of untreated gas.

The pre-separating device may for example be suspended, clipped, latched, plugged in and/or otherwise secured upstream of a main filter device of a filter module.

The pre-separating device may for example be arranged on or in a catching element, for example a catching trough.

The pre-separating device preferably has a flow cross section that corresponds at least to an inflow cross section of a filter module.

The pre-separating device may in this case include for example one or more segments.

Preferably, the pre-separating device extends over individual, several or all of the filter elements of the main filter device of the filter module.

For changing a successive filter stage, in particular of filter elements of the main filter device, the pre-separating device is preferably demounted.

The pre-separating device may for example include cardboard material, synthetic material, ceramic material and/or metal or be formed from cardboard material, synthetic material, ceramic material and/or metal.

If necessary, the pre-separating device is preferably arrangeable on a filter module, in particular on filter modules that are arranged below painting zones having a high incidence of paint overspray. The period over which a filter module is operated until one or more filter elements are exchanged may preferably be increased by the use of a pre-separating device.

The pre-separating device is preferably retrofittable on a filter module.

In one embodiment of the invention, it may be provided for one or more filter modules to include one or more filter elements that are received displaceably in the filter module.

It may be advantageous if, for removing one or more filter elements from the filter module, the filter module as a whole is tiltable, such that one or more filter elements slide out of the filter module. In particular, in this way these filter elements may be fed directly to a disposal container.

It may be favourable if a filter module is equipped with pre-assembled filter units that in particular comprise a plurality of filter elements. As a result, the equipping of a filter module may preferably be accelerated and/or automated.

In a further development of the invention, it may be provided for a filter module to be a driverless transport vehicle or to include a driverless transport vehicle.

A filter module of this kind may preferably by itself move to a filter position on a filter module receptacle and/or to a change-over point for changing over one or more filter elements.

As an alternative or in addition thereto, it may be provided for the filter system to include a separate vehicle with a power unit, in particular a driverless transport vehicle, by means of which a preferably unpowered filter module is transportable from a filter module receptacle to a change-over point and/or from the change-over point to the filter module receptacle.

Further preferred features and/or advantages of the invention form the subject matter of the description below and the illustration of exemplary embodiments in the drawings.

BRIEF DESCRIPTION OF THE DRAWINGS

FIG. 22 shows a schematic side view of an alternative embodiment of a filter module, in which there is provided an immobilising device that includes a shoot bolt rod that is engageable with a projection on a floor;

FIG. 23 shows a schematic side view, corresponding to FIG. 22, of a further alternative embodiment of a filter module, in which there is provided an immobilising device that includes a shoot bolt rod that is engageable with a recess in a floor;

Like or functionally equivalent elements are provided with the same reference numerals in all the Figures.

DETAILED DESCRIPTION OF THE DRAWINGS

Figure 1:
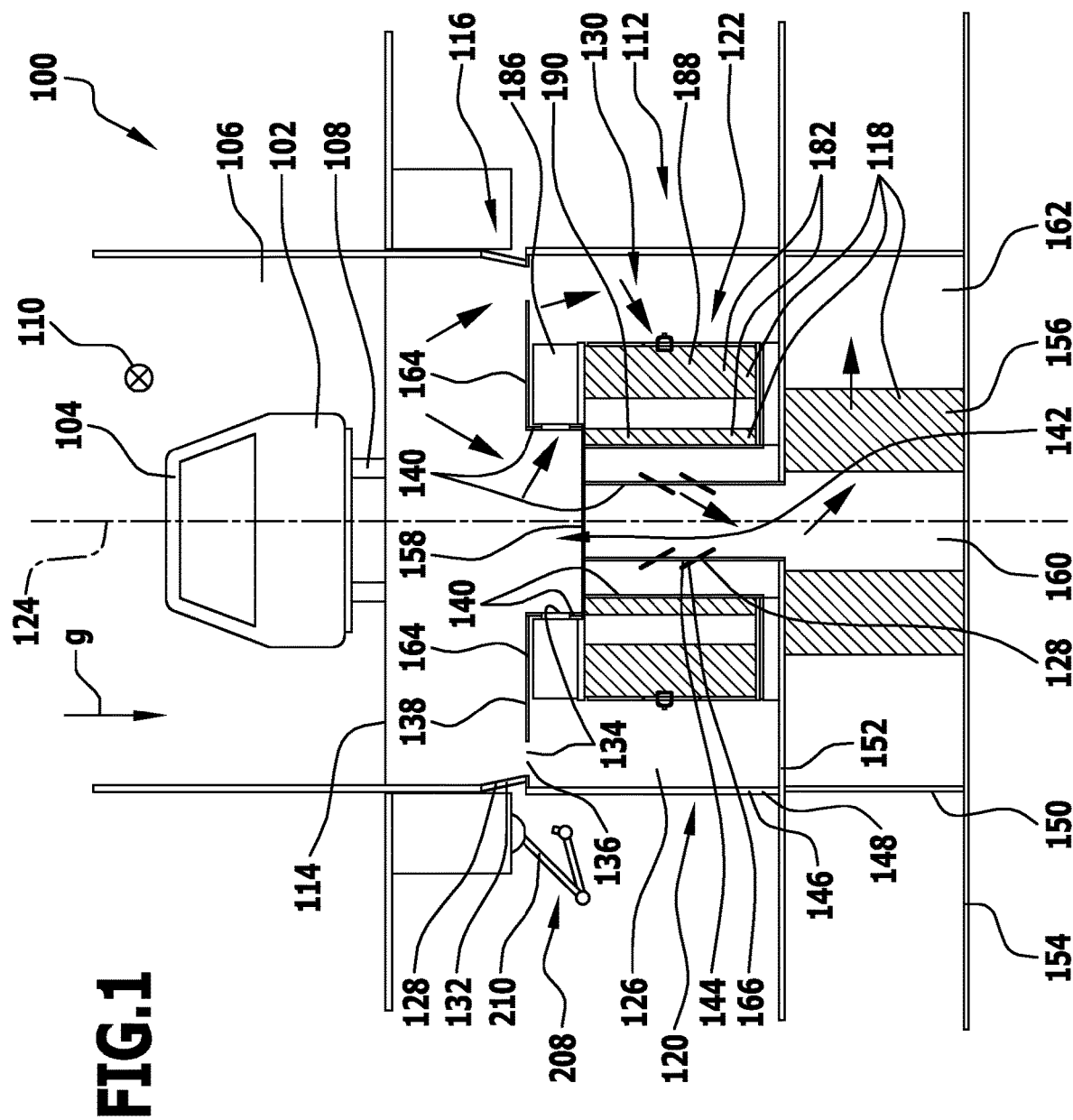
FIG. 1 shows a schematic vertical section through a first embodiment of a painting system for painting vehicle bodies, which includes a filter system for cleaning a stream of untreated gas that is laden with paint overspray.

A first embodiment, illustrated in FIGS. 1 to 8, of a painting system that is designated 100 as a whole serves for painting workpieces 102, for example vehicle bodies 104.

The painting system 100 is in particular a spray painting system, in which a liquid or powder paint is propelled in the direction of the workpiece 102 in order to coat the workpiece 102.

In order, during operation of the painting system 100, to prevent surfaces that are not to be painted from becoming undesirably contaminated, a stream of air flows in the direction of gravity g, downwards from above, through a paint spray booth 106 in which the actual painting procedure takes place.

As it flows through the paint spray booth 106, this stream of air takes up paint particles and/or paint droplets that do not adhere to the workpiece 102, and so becomes contaminated.

The stream of gas that is obtainable as a result is called the stream of untreated gas, which contains as contaminants paint overspray particles or paint overspray droplets.

The painting system 100 includes a conveying device 108 by means of which the workpieces 102, in particular the vehicle bodies 104, are conveyable through the paint spray booth 106 in a conveying direction 110.

To clean the stream of untreated gas that is laden with contaminants, the painting system 100 includes a filter system 112 that is arranged directly below the paint spray booth 106 and to which the stream of untreated gas is feedable through a booth floor 114 of the paint spray booth 106.

The filter system 112 includes a base construction 116, in particular a rack or housing in which a plurality of filter devices 118 are arranged.

In particular, the base construction 116 of the filter system 112 has a plurality of filter module receptacles 120 for receiving a plurality of filter modules 122.

The filter module receptacles 120 are arranged fixed to the painting system 100, in particular to the filter system 112.

By contrast, the filter modules 122 are preferably constructed to be movable and are selectively introducible into the filter module receptacles 120 or removable therefrom.

As can be seen from FIG. 1, in the first embodiment of the filter system 112 two filter module receptacles 120 and two filter modules 122 are arranged opposite one another in respect of a vertical longitudinal centre plane 124 of the paint spray booth 100, in particular the filter system 112, and are in particular constructed to be substantially mirror-symmetrical to one another.

In addition to the two filter module receptacles 120 and filter modules 122 that are illustrated, the filter system 112 preferably includes further filter module receptacles 120 and filter modules 122, which preferably form two rows, extending longitudinally in relation to the conveying direction 110, of filter module receptacles 120 and filter modules 122 arranged one behind the other.

Each filter module receptacle 120 preferably includes an interior space 126 which, by means of valve devices 128 that are associated with the respective filter module receptacle 120, is renderable accessible or is closable.

In particular, by means of each filter module receptacle 120, a separate flow channel 130 of the filter system 112 is formed. Preferably, some of the stream of untreated gas may be guided through each flow channel 130, substantially independently of the further flow channels 130.

In particular, when there is a filter module 122 in a filter module receptacle 120 it is thus possible in each flow channel 130 for some of the stream of untreated gas to be freed of contamination in a targeted manner, with the result that it is guidable away out of the respective filter module receptacle 120 as a stream of clean gas.

Each filter module receptacle 120 includes a valve device 128 that takes the form for example of a flap 132 and is arranged for example at an inlet opening 134 in the filter module receptacle 120.

The inlet opening 134 that is provided with the flap 132 is in particular a bypass opening 136 of the filter module receptacle 120.

Further, each filter module receptacle 120 preferably includes a further inlet opening 134 against which a pre-filter device (described below) of the associated filter module 122 abuts during filter operation of the filter system 112.

It is thus possible, by opening or closing the flap 132 of the bypass opening 136, to adjust in a targeted manner whether the stream of untreated gas flows into the interior space 126 of the filter module receptacle 120 through the bypass opening 136 and/or through the pre-filter device.

The inlet opening 134 that is associated with the bypass opening 136 is arranged in a top wall 138 of the filter module receptacle 120.

The further inlet opening 134 is arranged in a side wall 140 of the filter module receptacle 120 which is arranged facing the vertical longitudinal centre plane 124 of the filter system 112.

Formed by the mutually opposite pairs of filter module receptacles 120, by means of the side walls 140 of the filter module receptacles 120, is an untreated gas shaft 142 through which the untreated gas that is contaminated with paint overspray and is guided away out of the paint spray booth 106 is feedable to the filter devices 118.

Further, the filter module receptacles 120 each include at least one outlet opening 144 through which the stream of gas guided through the filter module receptacle 120 is guidable away.

Moreover, an access opening 146, in particular a closable door 148, is associated with each filter module receptacle 120.

Through the access opening 146, which is arranged in particular in an outer wall 150 of the filter system 112, a filter module 122 can be removed from the filter module receptacle 120, or a filter module 122 can be fed to the filter module receptacle 120.

As can be seen from FIG. 1, in the illustrated first embodiment the filter module receptacles 120 and accordingly also the filter modules 122 are arranged on a level 152 that is arranged above a floor 154 on which in turn the entire painting system 100 is constructed.

Arranged below, and in particular directly underneath, the filter module receptacles 120 are additional filter devices 156 which are preferably filter devices 118 other than the filter devices 118 of the filter modules 122.

As can further be seen from FIG. 1, the side walls 140 of the filter module receptacles 120 include the outlet openings 144.

With respect to the direction of gravity g, the outlet openings 144 are arranged below the inlet openings 134 and separated from one another by means of a separating wall 158, which connects to one another on a substantially horizontal plane the filter module receptacles 120, which are arranged opposite one another in respect of the vertical longitudinal centre plane 124.

In this arrangement, the region above the separating wall 158 is the untreated gas shaft 142.

The region below the separating wall 158 is the region into which the stream of gas that has been cleaned by means of the filter device 118 flows, and this region is thus called the clean gas channel 160.

The clean gas that flows out of the filter module receptacles 120 and is obtainable by cleaning the contaminated untreated gas is feedable to the additional filter devices 156 through the clean gas channel 160.

Flow through the additional filter devices 156 is then in a substantially horizontal direction in order to further enhance the cleanness of the clean gas.

Finally, this clean gas is fed to two collecting channels 162 which are arranged on the sides of the additional filter devices 156 remote from the vertical longitudinal centre plane 124.

The top wall 138 of each filter module receptacle 120 is oriented substantially horizontal in the case of the first embodiment of the painting system 100, in particular the filter system 112, that is illustrated in FIGS. 1 to 8.

In this arrangement, the top wall 138 forms a flow guide plate 164 by means of which the stream of untreated gas is feedable in targeted manner to the inlet openings 134.

Further details relating to the filter module receptacle 120 and the filter module 122 will be described below with particular reference to FIGS. 2 and 3.

Figure 2:
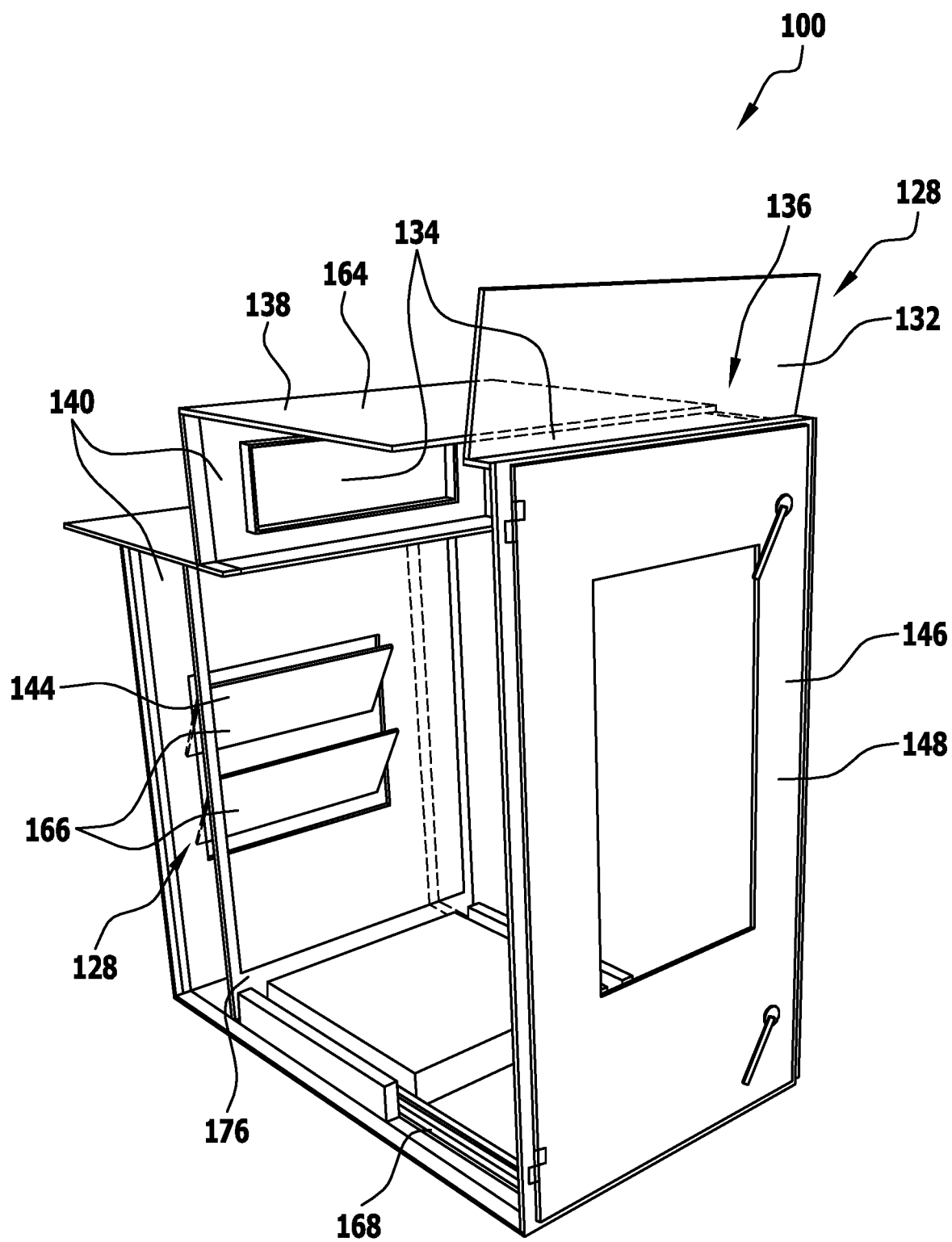
FIG. 2 shows a schematic perspective illustration of a filter module receptacle of the filter system, by means of which a filter module for cleaning the stream of untreated gas is receivable.
Figure 3:
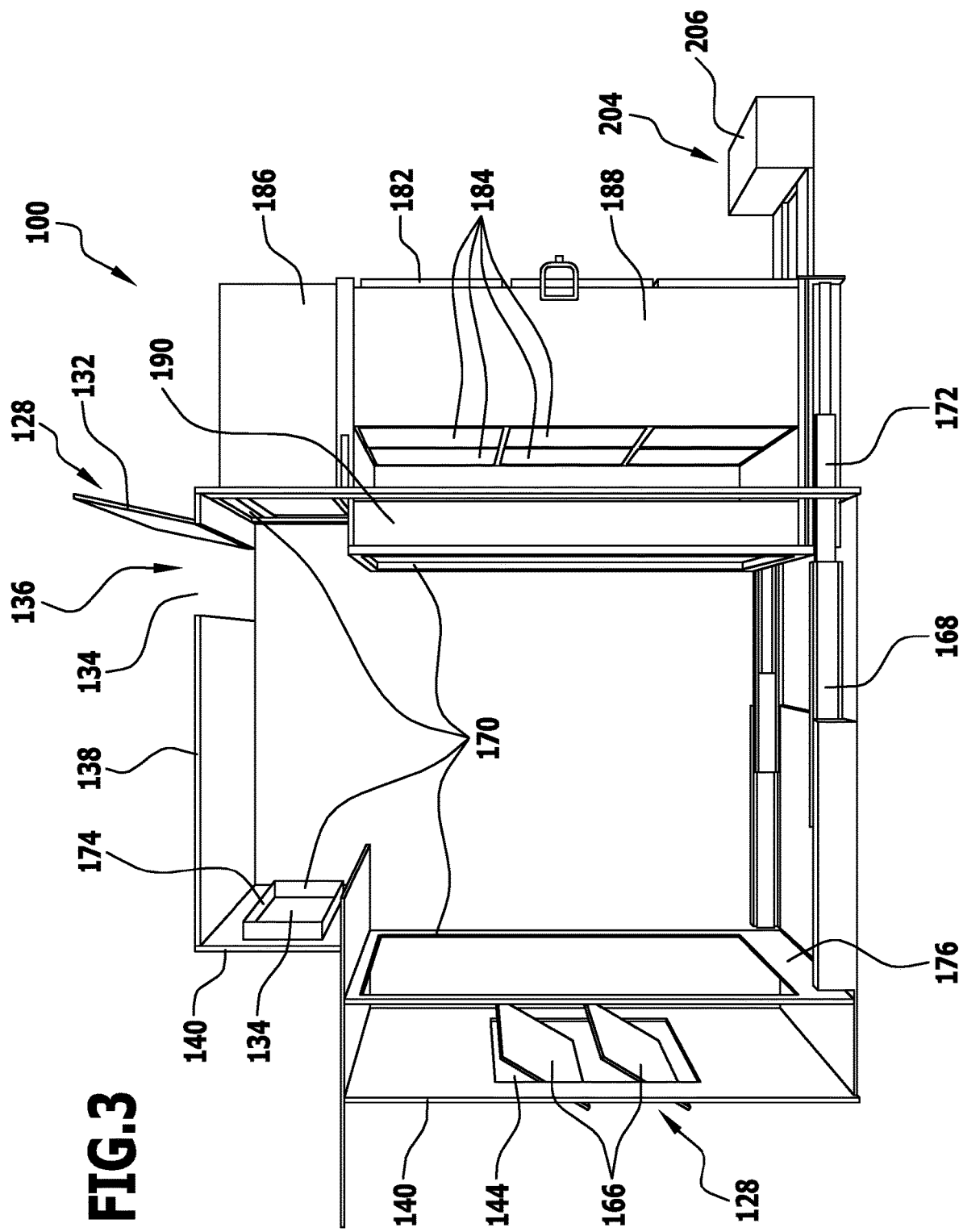
FIG. 3 shows a schematic side view of the filter module receptacle from FIG. 2 and a filter module, during the introduction or removal of the filter module into or out of the filter module receptacle.

As can be seen from FIGS. 2 and 3, the valve device 128 in the region of the outlet opening 144 takes the form of a louvre flap 166.

Moreover, a guide device 168 is provided in the filter module receptacle 120.

Finally, the filter module receptacle 120 also includes a plurality of sealing regions 170 for bringing into abutment corresponding sealing regions 170 of a filter module 122.

The guide device 168 in particular serves for moving, guiding and/or immobilising a filter module 122 in relation to the filter module receptacle 120.

The guide device 18 includes in particular a telescopic rail guide 172 by means of which a filter module 122 is movable from the filter position illustrated in FIG. 1 into a change-over position.

In the filter position of the filter module 122, the sealing regions 170 of the filter module receptacle 120 and the sealing regions 170 of the filter module 122 abut against one another, with the result that a stream of gas flowing through the filter module receptacle 120 and the filter module 122 reliably follows a predetermined flow path.

A first sealing region 170 of the filter module receptacle 120 takes the form of an inlet region 174 of the inlet opening 134 that is arranged in the side wall 140. In this arrangement, the inlet region 174 is in particular a projection that projects into the interior space 126 of the filter module receptacle 120.

The further sealing region 170 of the filter module receptacle 120 is formed by a frame element 176, which is a different element from a wall of the filter module receptacle 120 and runs substantially parallel to the side wall 140 in the region of the outlet opening 144.

In the embodiment of a filter module receptacle 120 and a filter module 122 that is illustrated in FIGS. 2 and 3, the guide device 168 takes the form of a telescopic rail guide 172, as described above.

Figure 4:
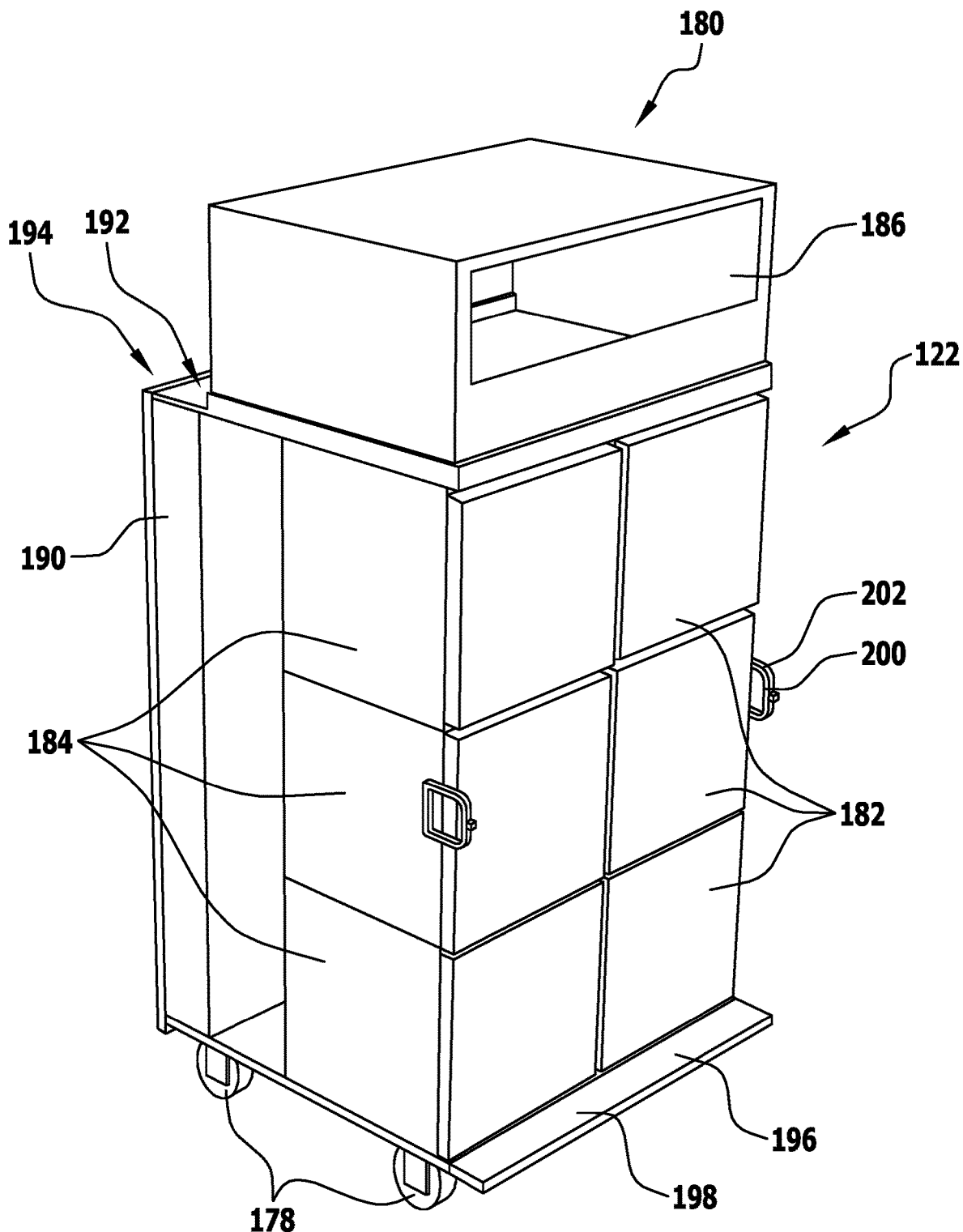
FIG. 4 shows a schematic perspective illustration of an alternative embodiment of a filter module.
Figure 5:
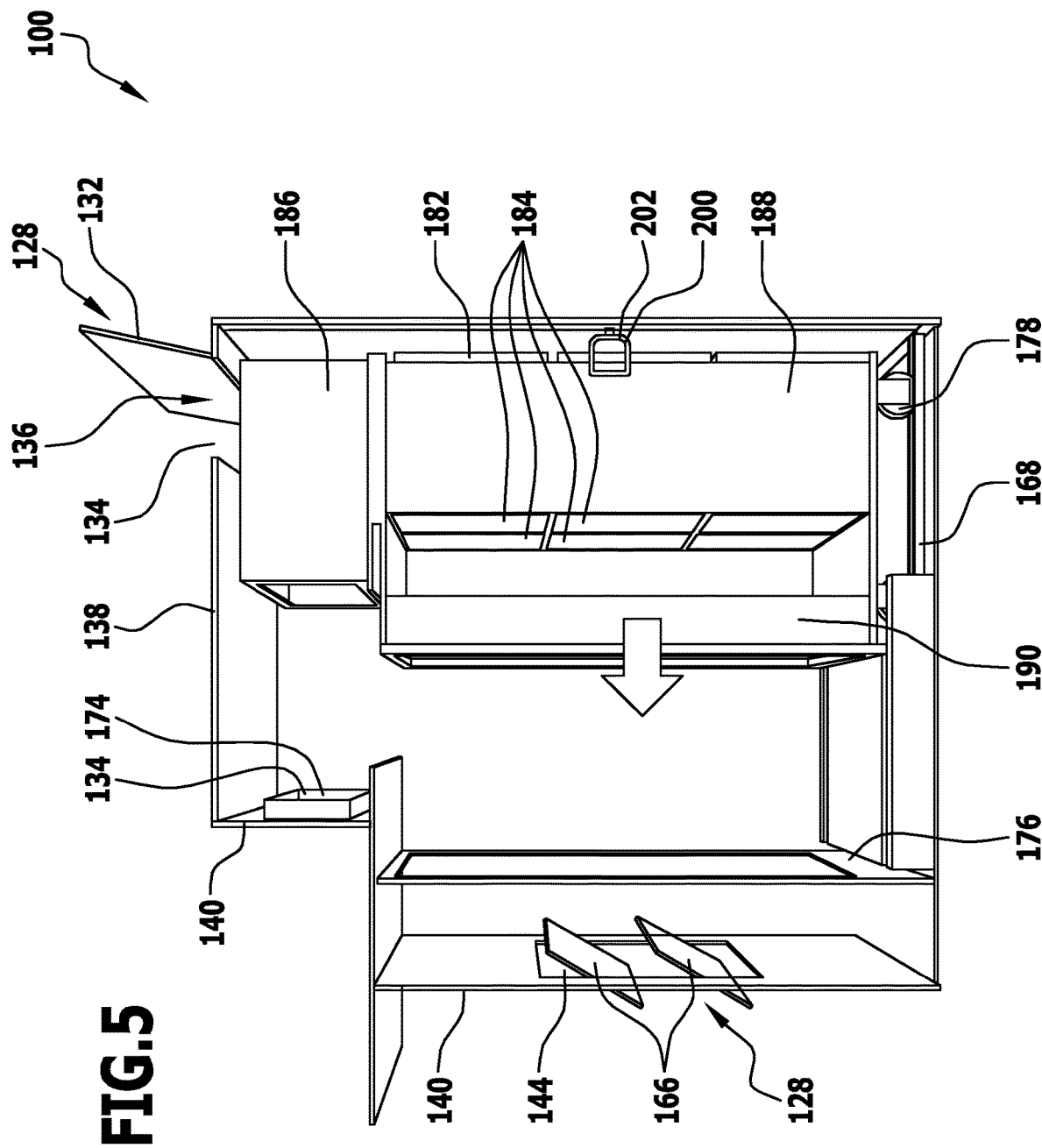
FIG. 5 shows a schematic side view, corresponding to FIG. 3, of the filter module from FIG. 4 and an alternative embodiment of the filter module receptacle, during the introduction of the filter module into the filter module receptacle.
Figure 6:
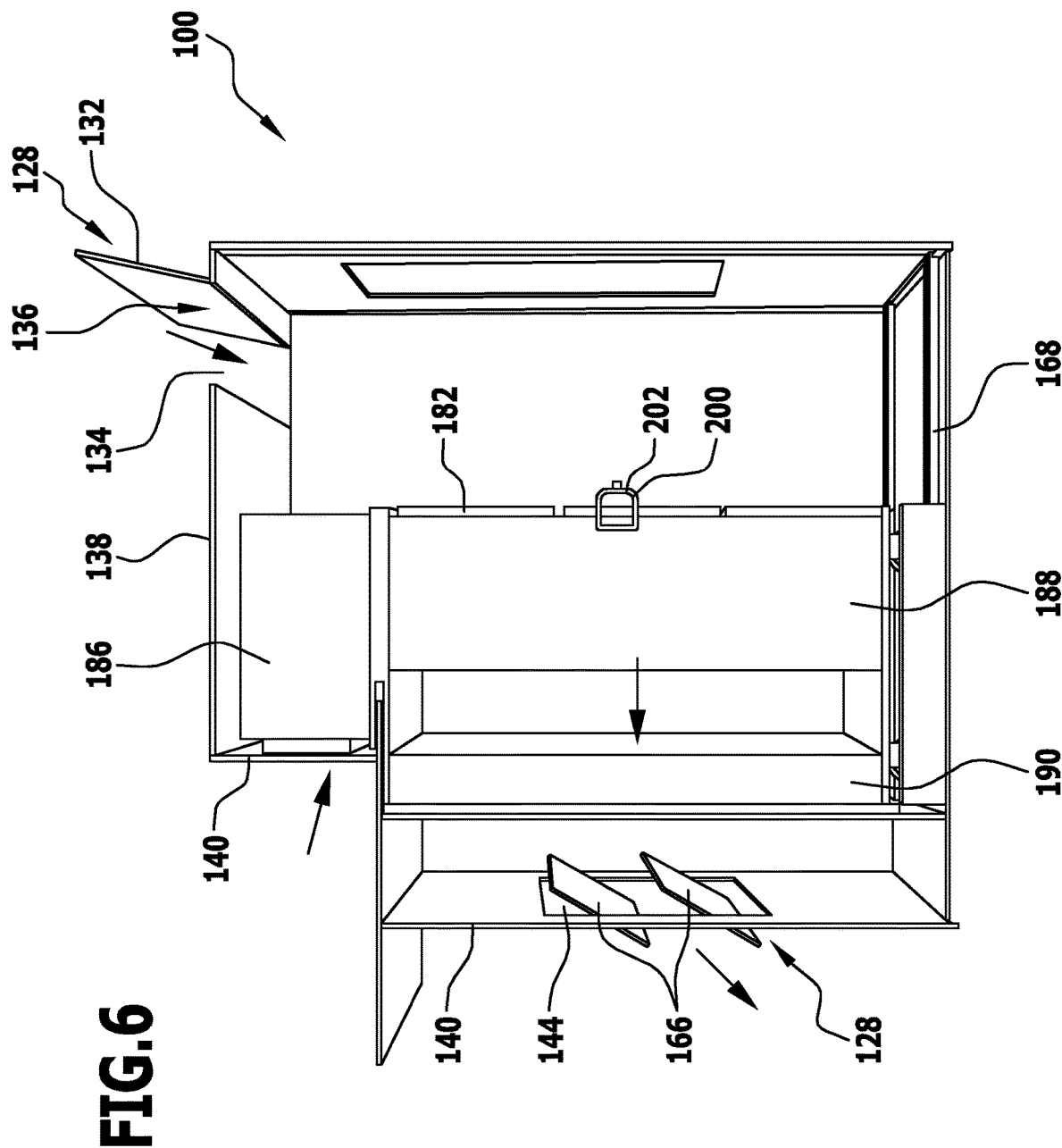
FIG. 6 shows a schematic side view, corresponding to FIG. 5, of the filter module receptacle and the filter module, wherein the filter module is arranged in a filter position.

Instead of a telescopic rail guide 172 of this kind, however, a roller guide 178 may also be provided (see FIGS. 4 to 6).

Since the embodiment of the filter module receptacle 120 and the filter module 122 according to FIGS. 2 and 3 otherwise coincides with the embodiment according to FIGS. 4 to 6, reference will be made below to all the FIGS. 1 to 6 and to further FIGS. 7 and 8 for a detailed description of the filter module 122.

As can be seen in particular from FIG. 4, the filter module 122 preferably takes the form of a transport carriage 180. By means of this transport carriage 180, in particular a plurality of filter elements 182 can be transported together.

For this purpose, the filter module 122 includes a plurality of filter element receptacles 184 for receiving a plurality of filter elements 182.

The filter elements 182 and the filter element receptacles 184 are preferably arranged and/or constructed independently of one another such that individual filter elements 182 can be removed from the filter element receptacles 184 independently of the further filter elements 182 and, for example for exchanging contaminated filter elements 182, can be replaced by fresh filter elements 182.

The filter module 122 preferably includes three filter devices 118, through which the stream of gas flows one after the other or successively, in relation to a direction of flow during the filter operation of the filter system 112.

A pre-filter device 186, a main filter device 188 and a post-filter device 190 are provided in accordance with the order of through flow.

The pre-filter device 186 is for example an inertial filter having a single or multiple points of deflection.

For this purpose, the pre-filter device 186 preferably includes only a single filter element 182.

A filter element receptacle 184 for receiving the filter element 182 of the pre-filter device 186 may for example be a frame 192 or rack 194 of the filter module 122.

The pre-filter device 186 is in particular arranged directly over the main filter device 188.

The main filter device 188 includes a plurality of filter element receptacles 184, for example six, for receiving a plurality of filter elements 182, in particular six.

The filter elements 182 of the main filter device 188 are preferably inertial separators, for example disposable filters.

The post-filter device 190 is arranged laterally adjacent to the main filter device 188.

The post-filter device 190 in particular includes a single filter element 182, which takes the form for example of a mat filter.

Flow is possible through the filter elements 182 of the pre-filter device 186, the main filter device 188 and the post-filter device 190 in a substantially horizontal direction.

A direction of flow through the pre-filter device 186 is in this arrangement opposed to the direction of flow through the main filter device 188 and the post-filter device 190.

The filter module 122 further includes at least one catching element 196 by means of which contaminants falling during filter operation of the filter module 122 and/or during the exchange of filter elements 182 are catchable.

The catching element 196 in particular takes the form of a trough 198.

Finally, the filter module 122 also includes one or more handling elements 200, for example handles 202, by means of which a person can simply grasp the filter module 122 in order to move it.

As can be seen in particular from FIG. 3, aside from the possibility of moving by means of the guide device 168, the filter module 122 is also movable by means of a separate transport device 204.

The transport device 204 may for example be a lifting truck device 206 by means of which the filter module 122 is liftable and transportable away.

As an alternative thereto, in one embodiment (not illustrated) of the painting system 100, in particular the filter system 112, it may be provided for one or more filter modules 122 to be movable, in particular transportable, by means of an overhead conveyor or a driverless transport system.

By means of the guide device 168, the filter module 122 is movable in particular from a filter position (see FIG. 6) into a change-over position and/or from the change-over position into the filter position.

By means of the transport device 204, the filter module 122 is receivable at the place in which it is located in the change-over position, and is transportable away therefrom. Further, a filter module 122 is transportable to the filter system 112 by means of the transport device 204, in particular such that a filter module 122 that is transported inwards is movable into the change-over position.

As can be seen from FIG. 1, the filter system 112 may include a change-over device 208 for automatically changing over individual or a plurality of filter elements 182 or individual or a plurality of filter modules 122.

The change-over device 208 in particular takes the form of a robotic device 210 and is movable along the filter system 112, in and in opposition to the conveying direction 110.

A change-over device 208 of this kind may be provided on one side or on both sides of the filter system 112 (illustrated only on one side in FIG. 1).

The painting system 100 described above, in particular the filter system 112 described above, functions as follows:

During operation of the painting system 100, the air guided through the paint spray booth 106 is contaminated with paint overspray and is fed to the filter system 112 as a contaminated stream of untreated gas.

During this, the stream of untreated gas flows into the untreated gas shaft 142 and through the inlet openings 134 in the side walls 140 into the filter module receptacles 120.

A further portion of the stream of untreated gas, in particular a portion of the stream of untreated gas that flows close to the outer walls 150 of the paint spray booth 106 and the filter system 112, preferably flows through the bypass openings 136, that is to say through the inlet openings 134 in the top walls 138, of the filter module receptacles 120 and into the interior space 126 of the filter module receptacles 120.

Since the pre-filter devices 186 of the filter modules 122 are directly adjacent to the inlet openings 134 in the side walls 140 of the filter module receptacles 120, the portion of the stream of untreated gas that flows through these inlet openings 134 in the side walls 140 is guided through the pre-filter devices 186 and is thus already freed of some of the contaminants contained therein.

After flowing through the pre-filter devices 186, this portion of the stream of untreated gas is merged with the stream of untreated gas that has been guided through the bypass openings 136 and is fed to the main filter devices 188.

As it flows through the main filter devices 188, the stream of untreated gas is further cleaned and thereafter is fed to the post-filter devices 190 for even more thorough separation of contaminants.

After flowing through all the filter devices 118 of the filter modules 122, the stream of gas that has been cleaned in this way leaves the filter module receptacles 120 as a stream of clean gas, through the outlet openings 144 of the filter module receptacles 120.

In particular, the stream of clean gas then reaches the clean gas channel 160.

In the clean gas channel 160, the stream of clean gas is guided downwards in the direction of gravity g and is then fed to the additional filter devices 156 in the horizontal direction.

After supplementary cleaning of the stream of clean gas by means of the additional filter devices 156, the stream of clean gas reaches the collecting channels 162 and is guided away out of the filter system 112 by means of the collecting channels 162.

After a certain duration of operation of the painting system 100, in particular after a certain duration of operation of the filter system 112, the filter elements 182 of the filter devices 118 are laden with contaminants, in particular being contaminated with paint overspray.

This reduces the filtering performance of the filter elements 182. Further, it brings about an increase in the flow resistance of the filter elements 182.

The filter system 112 then no longer operates at maximum efficiency.

Thus, the filter elements 182 have to be exchanged at regular intervals, wherein more pronouncedly contaminated filter elements 182 in particular have to be replaced by fresh filter elements 182.

For this purpose, first the inlet opening 134 in the top wall 138 and/or the outlet opening 144 in the side wall 140 are closed by means of the valve devices 128. This interrupts the flow through the filter module receptacle 120.

The access opening 146, in particular the door 148, can now be opened in order to move the filter module 122 from the filter position into the change-over position.

In this change-over position, individual or a plurality of filter elements 182 can be exchanged and replaced by fresh filter elements 182.

As an alternative thereto, it may be provided for first the inlet opening 134 in the top wall 138 to be closed and then the access opening 146, in particular the door 148, to be opened and thereafter the outlet opening 144 in the side wall 140 to be closed. As a result of this, the filter module receptacle 120 and/or the filter module 122 can be flushed with fresh air, in particular ambient air or air from the factory, before the filter module 120 is moved from the filter position into the change-over position.

The outlet opening 144 can further, as an alternative thereto, also remain open continuously, in particular throughout the change-over procedure.

Following the filter change, the filter module 122 may be moved back into the filter position and is then, once the valve devices 128 have been opened, available for further filter operation.

As an alternative thereto, once the filter module 122 has been moved out of the filter position into the change-over position, it may also be provided for the entire filter module 122 to be removed from the filter system 112 and exchanged for a fresh filter module 122, that is to say a filter module 122 having fresh filter elements 182.

This may in particular take place by means of the transport device 204 and/or by means of the change-over device 208.

Because the filter module receptacles 120 form substantially mutually independent flow channels 130 of the filter system 112, individual filter modules 122 or filter elements 182 may also be changed while operation of the filter system 112 continues, since during an exchange—that is to say the temporary shut-off—of individual filter modules 122 the remaining filter modules 122 continue to provide the function of cleaning the filter system 112.

Figure 7:
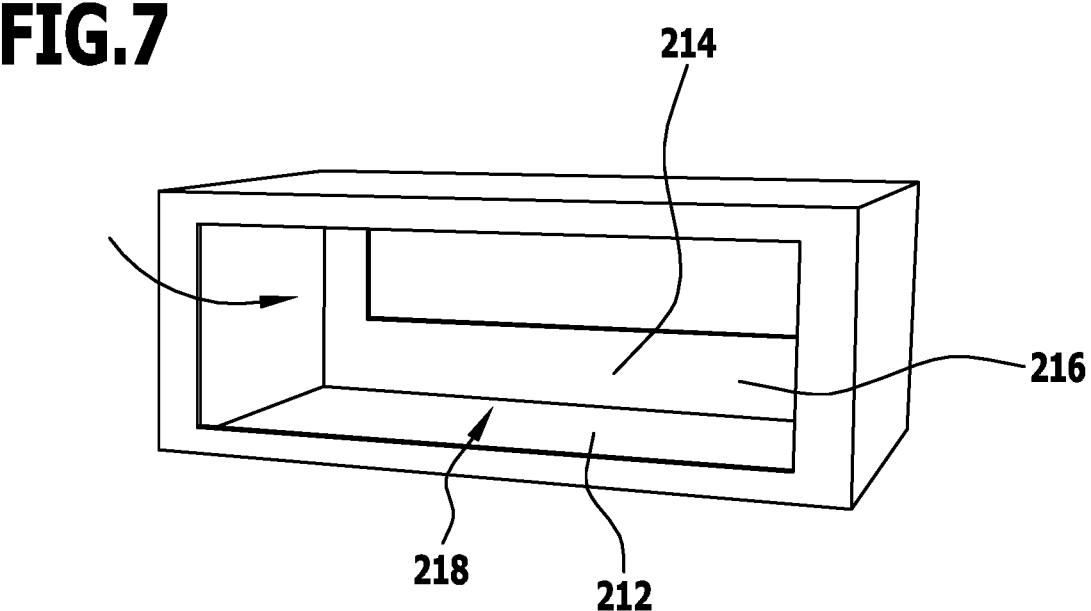
FIG. 7 shows a schematic perspective illustration of a pre-filter device of a filter module, wherein the pre-filter device has a single flow deflection point.
Figure 8:
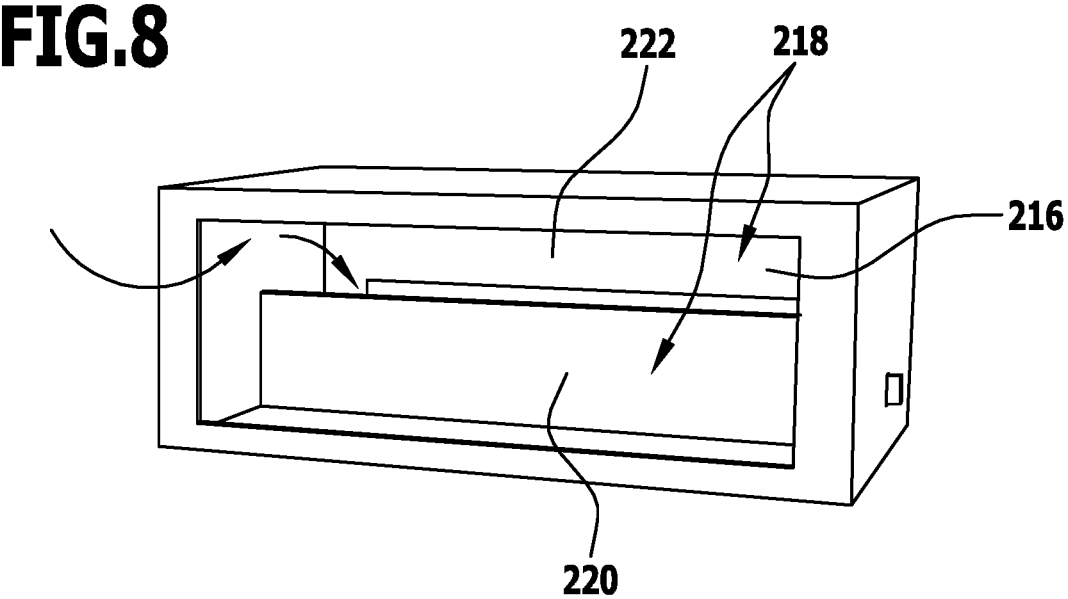
FIG. 8 shows an illustration, corresponding to FIG. 7, of an alternative embodiment of a pre-filter device of a filter module, wherein the pre-filter device has two flow deflection points.

FIGS. 7 and 8 illustrate different embodiments of pre-filter devices 186 which, depending on the requirement, may be used as a pre-filter device 186 of the filter modules 122 described.

FIG. 7 illustrates a pre-filter device 186 in which a single flow deflection point is provided. A bottom wall 212 and a lower section 214 of a back wall 216 of the filter element 182 of the pre-filter device 186 in this case form an impact region 218 at which contaminants, in particular particles of paint overspray, accumulate when flow is deflected.

The embodiment of the pre-filter device 186 that is illustrated in FIG. 8 differs therefrom substantially in that the filter element 182 includes an intermediate wall 220.

Because of the intermediate wall 220, and because of a different shape of the back wall 216, in the embodiment of the pre-filter device 186 that is illustrated in FIG. 8 two flow deflection points are provided.

In this arrangement, the bottom wall 212, the intermediate wall 220 and an upper section 222 of the back wall 216 serve as impact regions 218 for separating off contaminants, in particular particles of paint overspray.

Figure 9:
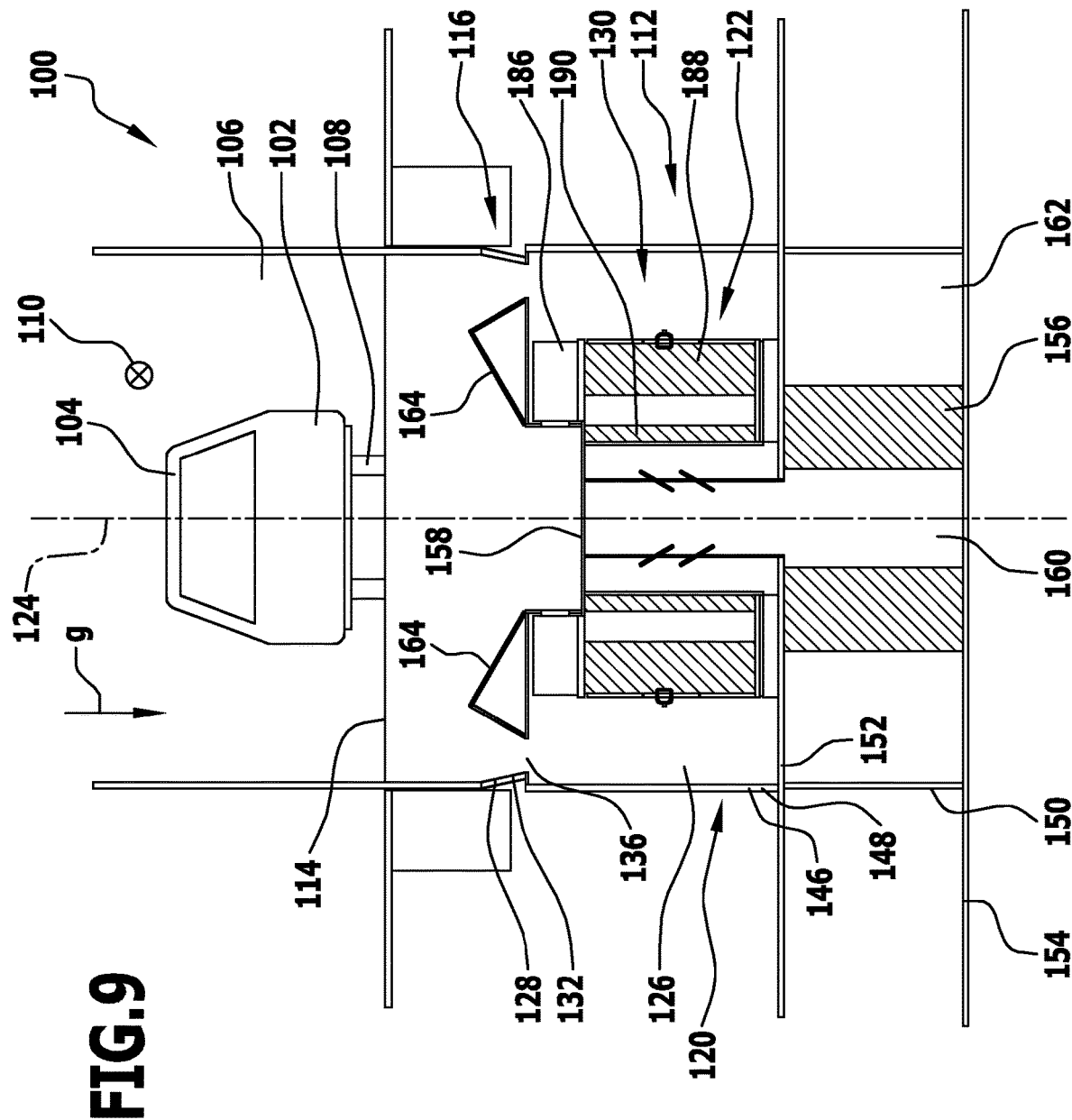
FIG. 9 shows a schematic sectional illustration, corresponding to FIG. 1, of a second embodiment of a painting system, in which flow guide plates which are arranged obliquely in relation to a direction of flow of the stream of untreated gas are provided.

A second embodiment of a painting system 100, in particular a filter system 112, that is illustrated in FIG. 9 differs from the embodiment illustrated in FIGS. 1 to 8 substantially in that the top wall 138 of each filter module receptacle 120, which serves as a flow guide plate 164, is oriented to be inclined instead of the substantially horizontal orientation.

As a result, the flow guide plates 164 of the filter system 112 enable a different flow guidance, in particular a different distribution of the stream of untreated gas between the bypass opening 136 and the inlet opening 134 in the side wall 140 of each filter module receptacle 120.

Otherwise, the second embodiment, illustrated in FIG. 9, of the painting system 100, in particular the filter system 112, corresponds, as regards its structure and functioning, to the first embodiment described above, so in this respect reference is made to the description thereof above.

Figure 10:
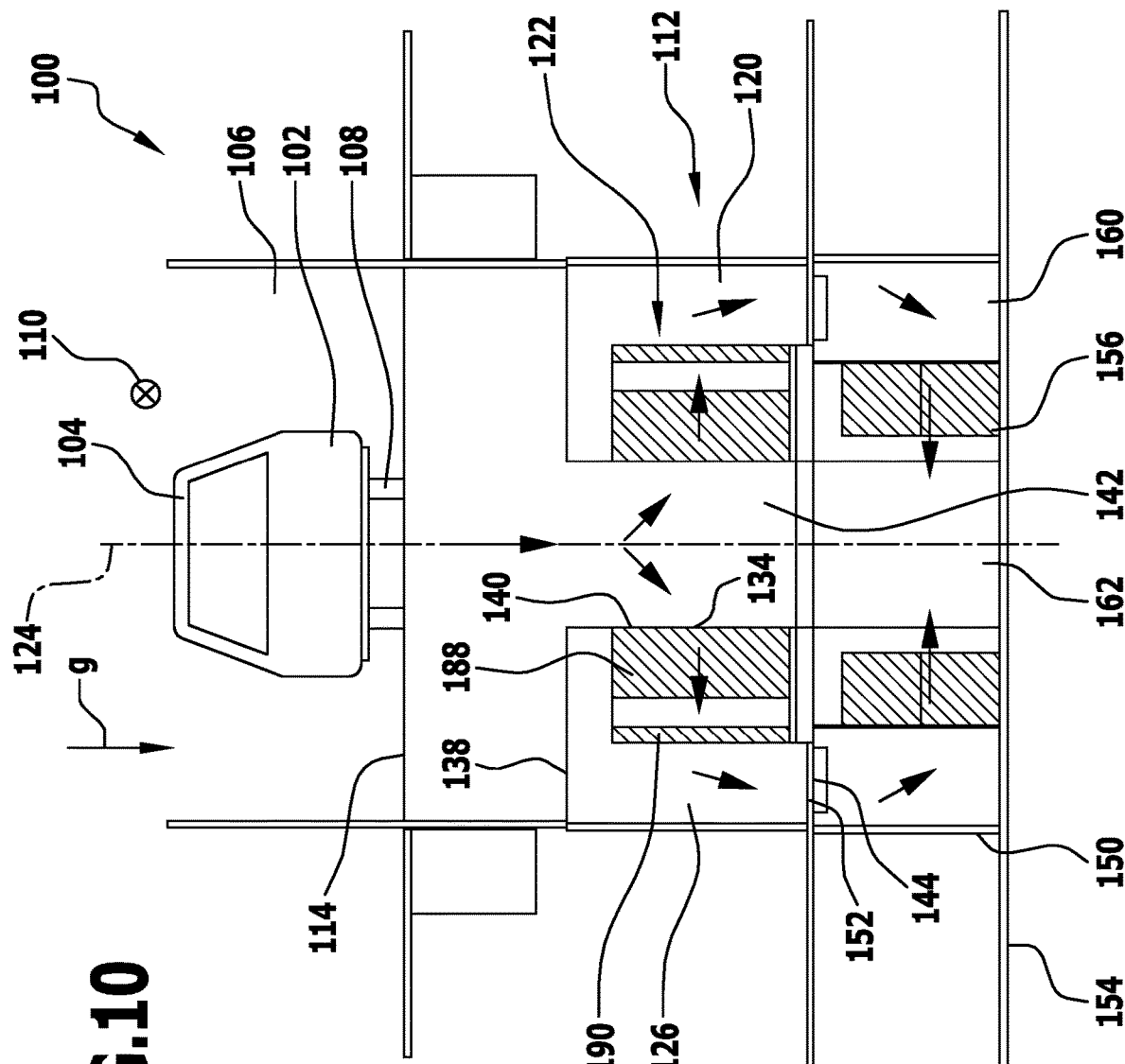
FIG. 10 shows a schematic sectional illustration, corresponding to FIG. 1, of a third embodiment of a painting system, which has an alternative arrangement and flow through filter devices of the filter system.

A third embodiment of a painting system 100, in particular a filter system 112, that is illustrated in FIG. 10 differs from the first embodiment which is illustrated in FIGS. 1 to 8 substantially in that the untreated gas shaft 142 extends over the entire height of the filter module receptacle 120 and only a single inlet opening 134, namely an inlet opening 134 in the side wall 140 of each filter module receptacle 120, is provided.

The top wall 138 of each filter module receptacle 120 thus has a closed surface.

Directly adjoining the inlet opening 134 in the side wall 140 is the main filter device 188, which is followed in the direction of flow by the post-filter device 190.

In the third embodiment of the painting system 100 that is illustrated in FIG. 10, no pre-filter device 186 is thus provided.

The outlet opening 144 of each filter module receptacle 120 is arranged in a plane 152 that downwardly delimits the filter module receptacle 120.

In this arrangement, the outlet opening 144 is arranged on the side of the filter module 122 remote from the vertical longitudinal centre plane 124.

Through the outlet opening 144, the stream of clean gas reaches the side of an additional filter device 156 remote from the vertical longitudinal centre plane 124.

Thus, flow through the additional filter device 156 is in a direction facing towards the vertical longitudinal centre plane 124.

In the region of the longitudinal centre plane 124 that is between the additional filter devices 156 of the filter system 112, there is arranged a collecting channel 162 through which the clean gas guided away out of all the filter modules 122 is guided away centrally.

The third embodiment of the painting system 100, in particular the filter system 112, that is illustrated in FIG. 10 can offer the advantage that the filter modules 122 are accessible through the access openings 146 from a clean gas side of the filter system 112.

This preferably reduces the risk of an undesirable exit of contaminated untreated gas when the access opening 146, in particular the door 148, is opened for changing over the filter modules 122.

Otherwise, the third embodiment, illustrated in FIG. 10, of the painting system 100, in particular the filter system 112, corresponds, as regards its structure and functioning, to the first embodiment illustrated in FIGS. 1 to 8, so in this respect reference is made to the description thereof above.

Figure 11:
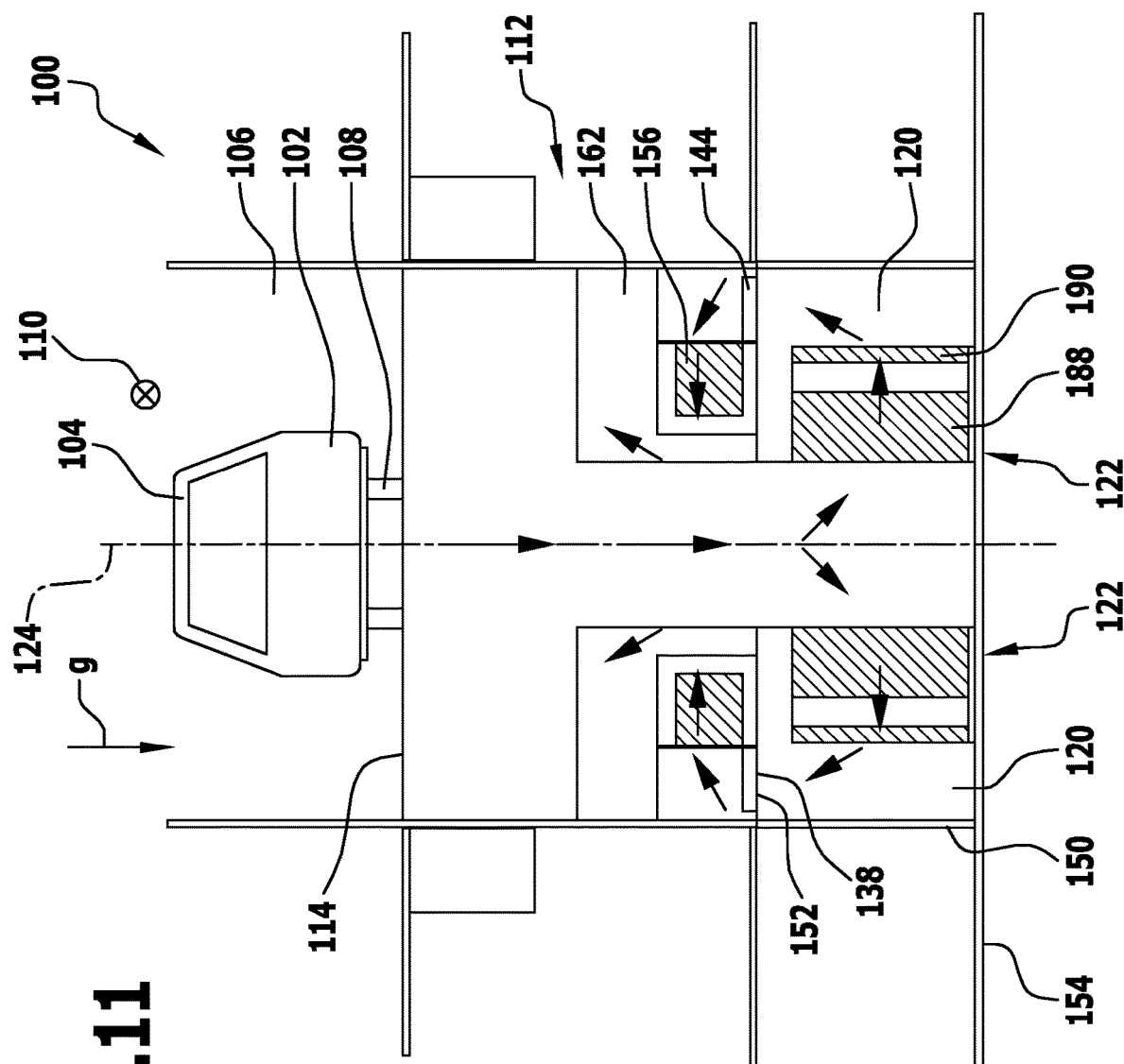
FIG. 11 shows a schematic sectional illustration, corresponding to FIG. 1, of a fourth embodiment of a painting system, which has a further alternative arrangement and flow through filter devices of the filter system.
Figure 12:
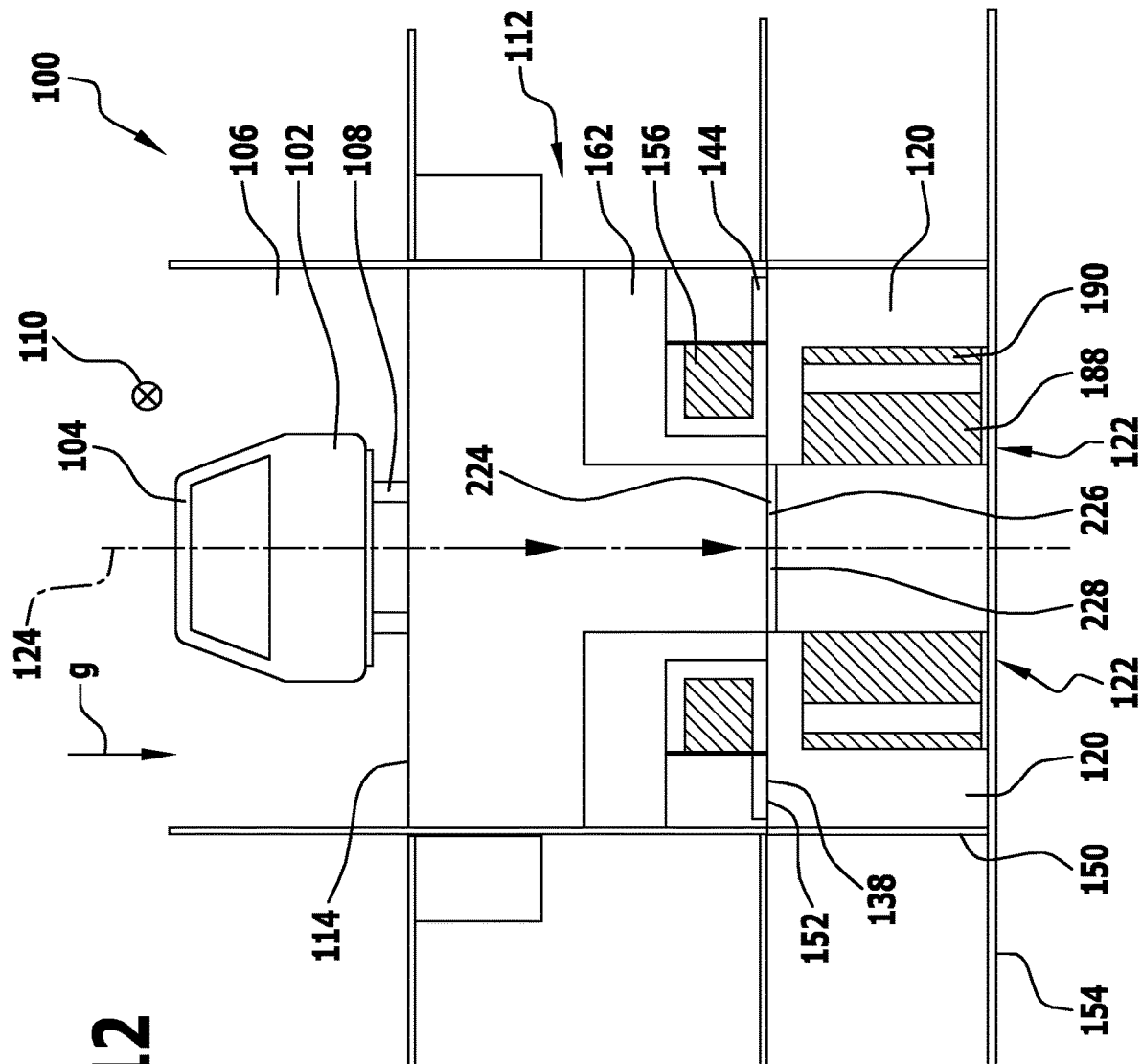
FIG. 12 shows a schematic sectional illustration, corresponding to FIG. 1, of the fourth embodiment of the painting system from FIG. 11, wherein an untreated gas shaft of the filter system of the painting system is closed.

A fourth embodiment of a painting system 100, in particular a filter system 112, that is illustrated in FIGS. 11 and 12 differs from the first embodiment which is illustrated in FIGS. 1 to 8 substantially in that the untreated gas shaft 142 extends along the vertical longitudinal centre plane 124 as far as a floor 154 of the filter system 112.

The filter module receptacles 120 are also arranged on the floor 154 of the filter system 112 and, in accordance with the third embodiment illustrated in FIG. 10, untreated gas flows through them from the inside outwards.

The clean gas that is obtained after flow through the filter modules 122 is guided away via outlet openings 144 of the filter module receptacles 120 arranged in the top wall 138.

Arranged above the filter module receptacles 120 are additional filter devices 156 and collecting channels 162, in order to further clean the clean gas and finally guide it away out of the filter system 112.

As can be seen in particular from FIG. 12, the painting system 100 according to the fourth embodiment, illustrated in FIGS. 11 and 12, preferably includes a fire protection device 224.

The fire protection device 224 may in particular include flap elements 226 or slide elements 228 which, in the event of a fire, are introducible into the untreated gas shaft 142 in order to close it.

The flap elements 226 or slide elements 228 may in particular be extensions to walls of the filter module receptacles 120 which, if necessary, are introducible into the untreated gas shaft 142, in particular being foldable or slidable thereinto.

The flap elements 226 or slide elements 228 are preferably associated with individual filter module receptacles 120 and can thus preferably also be introduced into the untreated gas shaft 142 in the region of individual filter module receptacles 120, independently of the flap elements 226 or slide elements 228 of the other filter module receptacles 120. As a result, during filter change-over this region can be protected from undesirable contamination, and the associated filter module 122 can be exchanged conveniently and with the minimum possible contamination.

In particular for optimising protection from fire, preferably all the walls of the filter module receptacle 120 and/or the filter system 112 are fire protection walls.

Otherwise, the fourth embodiment, illustrated in FIGS. 11 and 12, of a painting system 100, in particular a filter system 112, corresponds, as regards its structure and functioning, to the first embodiment illustrated in FIGS. 1 to 8, so in this respect reference is made to the description thereof above.

Figure 13:
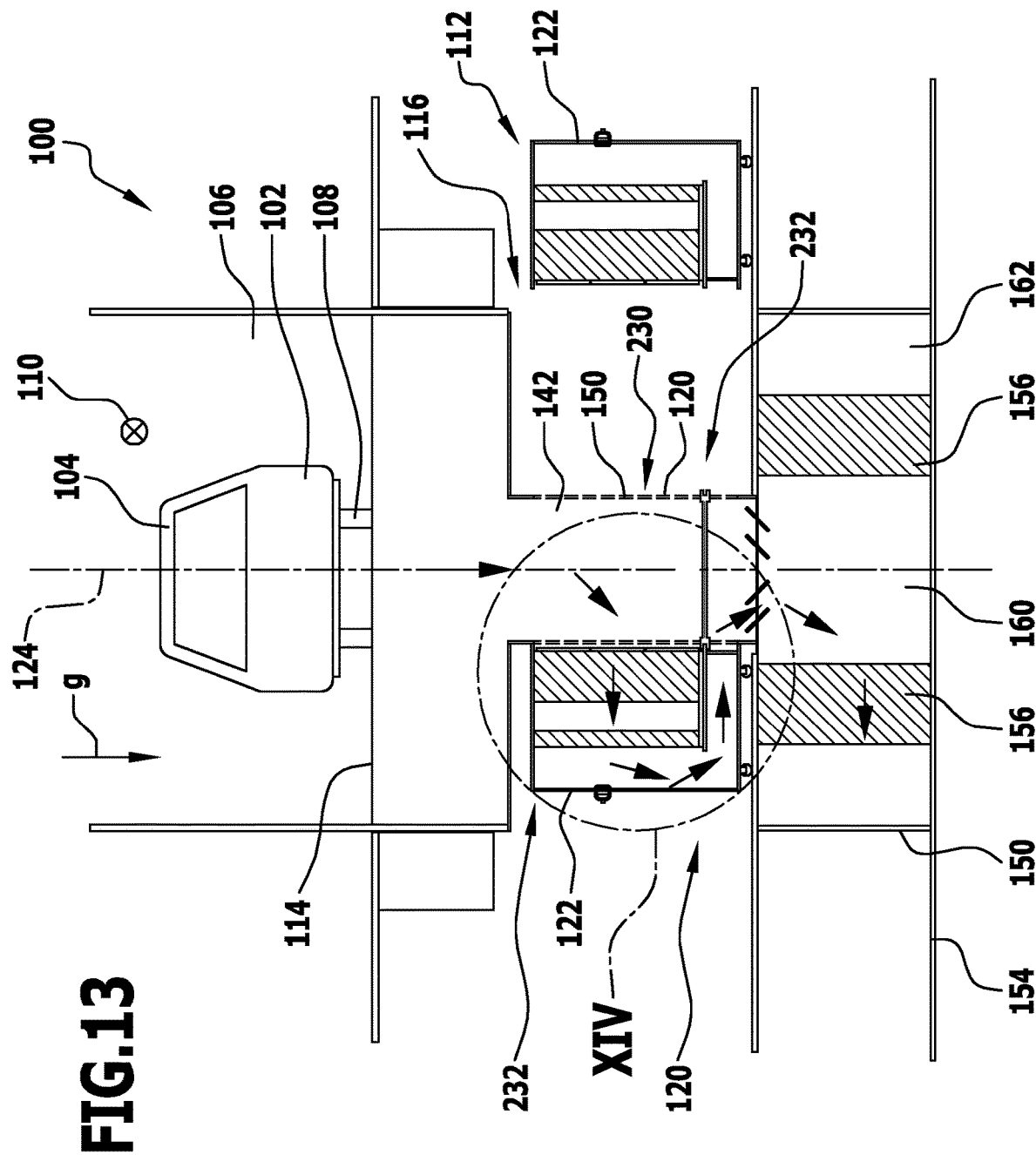
FIG. 13 shows a schematic sectional illustration, corresponding to FIG. 1, of a fifth embodiment of a painting system, in which filter modules that are abuttable against side walls of the filter system are provided.
Figure 14:
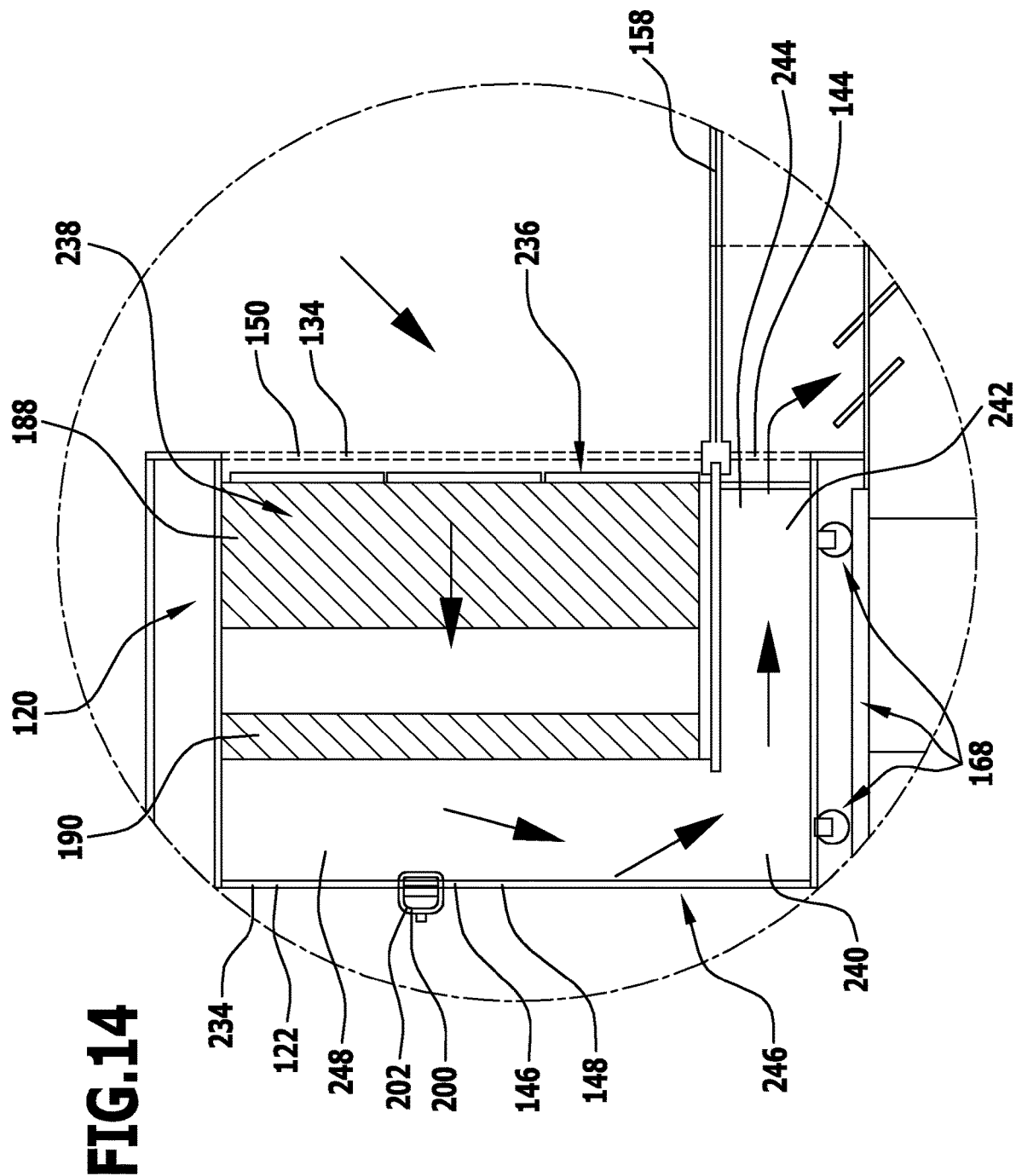
FIG. 14 shows an enlarged illustration of the region XIV in FIG. 13.

A fifth embodiment of a painting system 100, in particular a filter system 112, that is illustrated in FIGS. 13 and 14 differs from the first embodiment which is illustrated in FIGS. 1 to 8 substantially in that the filter module receptacles 120 take the form of regions 230 of abutment against the outer walls 150 of the filter system 112, in particular the base construction 116 of the filter system 112.

In this arrangement, the outer walls 150 are provided with recesses 232 in which the filter modules 122 are arrangeable.

The recesses 232 are of open construction. During filter operation of the filter system 112, the filter modules 122 are thus accessible from outside the filter system 112.

In the embodiment of the filter system 112 that is illustrated in FIGS. 13 and 14, the side wall 140 of the filter module receptacle 120, which is at the same time the outer wall 150 of the base construction 116, includes an inlet opening 134 and an outlet opening 144.

The inlet opening 134 and the outlet opening 144 are in this arrangement arranged over one another in relation to the direction of gravity g and are separated from one another by means of a separating wall 158.

In this arrangement, the inlet opening 134 is arranged over the outlet opening 144.

The filter modules 122 that are abuttable against the regions 230 of abutment each include a main filter device 188 and a post-filter device 190.

In a further embodiment (not illustrated), a pre-filter device 186 may moreover be provided.

The filter modules 122 each include a housing 234, which is in particular closed or closable to be fluid-tight on five sides.

A front side 236 of the housing 234, which in the filter position of the filter modules 122 abuts against the side wall 140 of the filter module receptacle 120, is preferably constructed to be open and is abuttable against the inlet opening 134 and the outlet opening 144.

The filter module receptacle 120 and/or the filter module 122 include two flange regions, which surround the inlet opening 134 and the outlet opening 144 and seal off the filter module receptacle 120 and the associated filter module 122 from an area surrounding the filter system 112.

Each filter module 122 includes an inflow section 238 which adjoins the inlet opening 134, a reversal section 240 for flow reversal, a return section 242 for returning the stream of gas in the direction of the front side 236 of the filter module 122, and an outflow section 244 through which the stream of gas is feedable to the outlet opening 144.

The inflow section 238 is arranged, in accordance with the arrangement of the inlet opening 134 and the outlet opening 144, over the outflow section 244.

The return section 242 is in particular arranged below the main filter device 188 and the post-filter device 190.

The reversal section 240 is in particular arranged in the region of a rear side 246 of the filter module 122, which is arranged in opposition to the front side 236 of the filter module 122.

The rear side 246 of the filter module 122 in particular includes an access opening 146, for example a door 148, through which an interior space 248 of the filter module 122 is accessible. As a result, the filter elements 182 of the post-filter device 190 and/or the main filter device 188 are accessible, for simple exchange thereof.

As can be seen in particular from FIG. 14, in the embodiment of the filter system 112 that is illustrated in FIGS. 13 and 14 the guide device 168 is arranged outside a region of the filter system 112 through which a stream of gas flows. This can reduce or entirely prevent an undesirable contamination of the guide device 168 during filter operation of the filter system 112.

Otherwise, the fifth embodiment, illustrated in FIGS. 13 and 14, of the painting system 100, in particular the filter system 112, corresponds, as regards its structure and functioning, to the first embodiment illustrated in FIGS. 1 to 8, so in this respect reference is made to the description thereof above.

Figure 15:
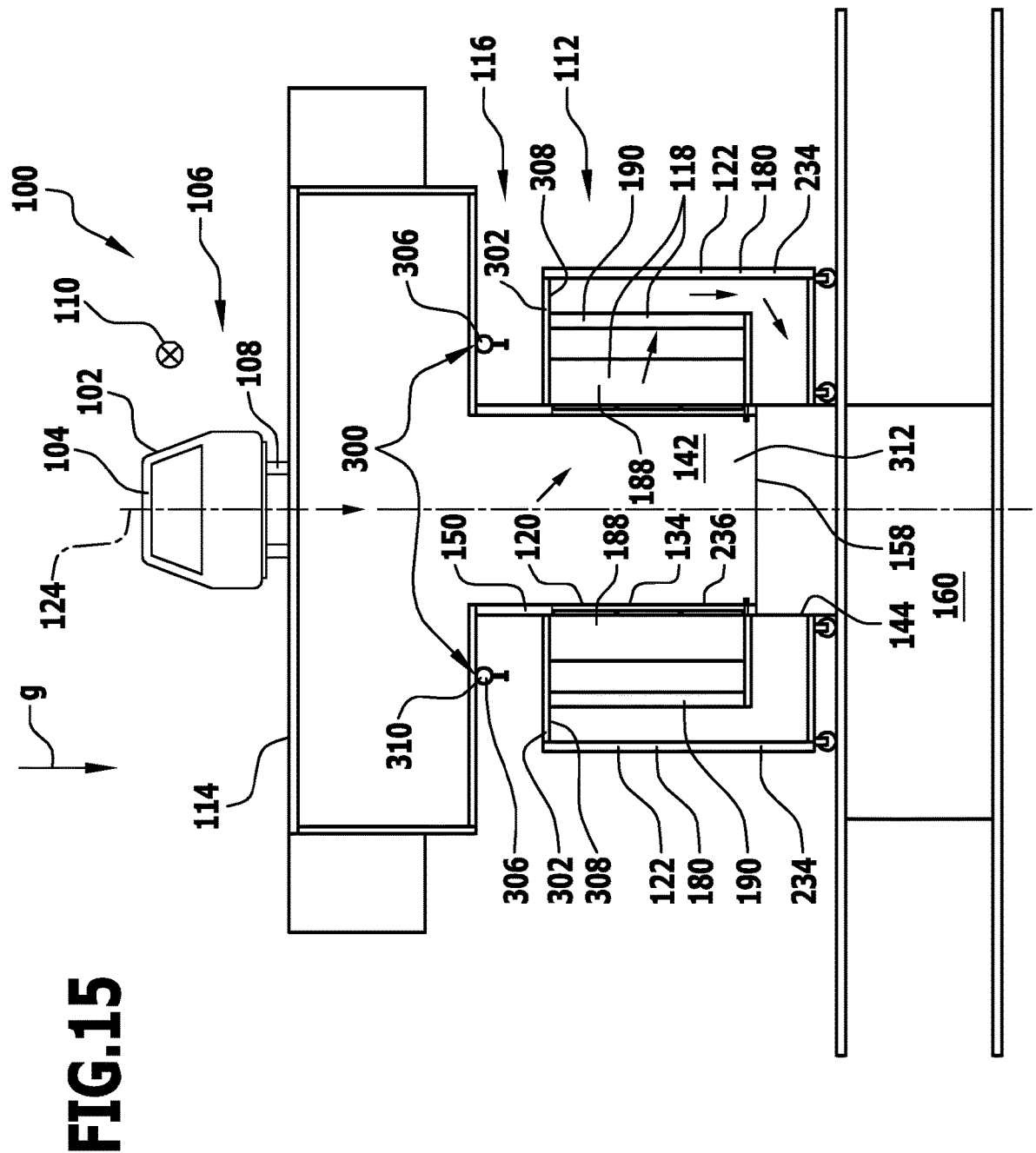
FIG. 15 shows a schematic sectional illustration, corresponding to FIG. 1, of a sixth embodiment of a painting system, in which filter modules that are abuttable against side walls of the filter system and a fire protection device are provided.
Figure 16:
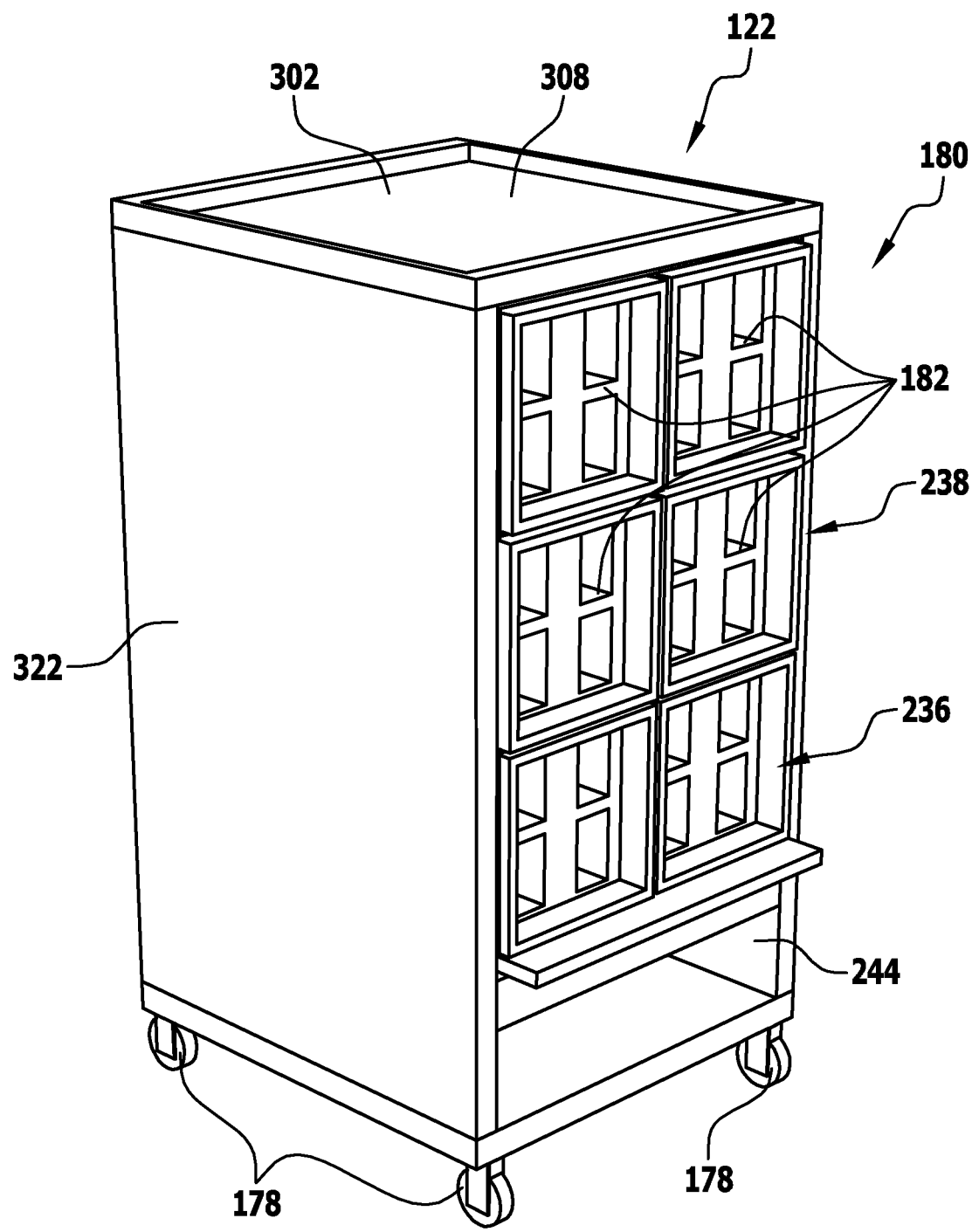
FIG. 16 shows a schematic perspective illustration of a filter module of the painting system from FIG. 15.
Figure 17:
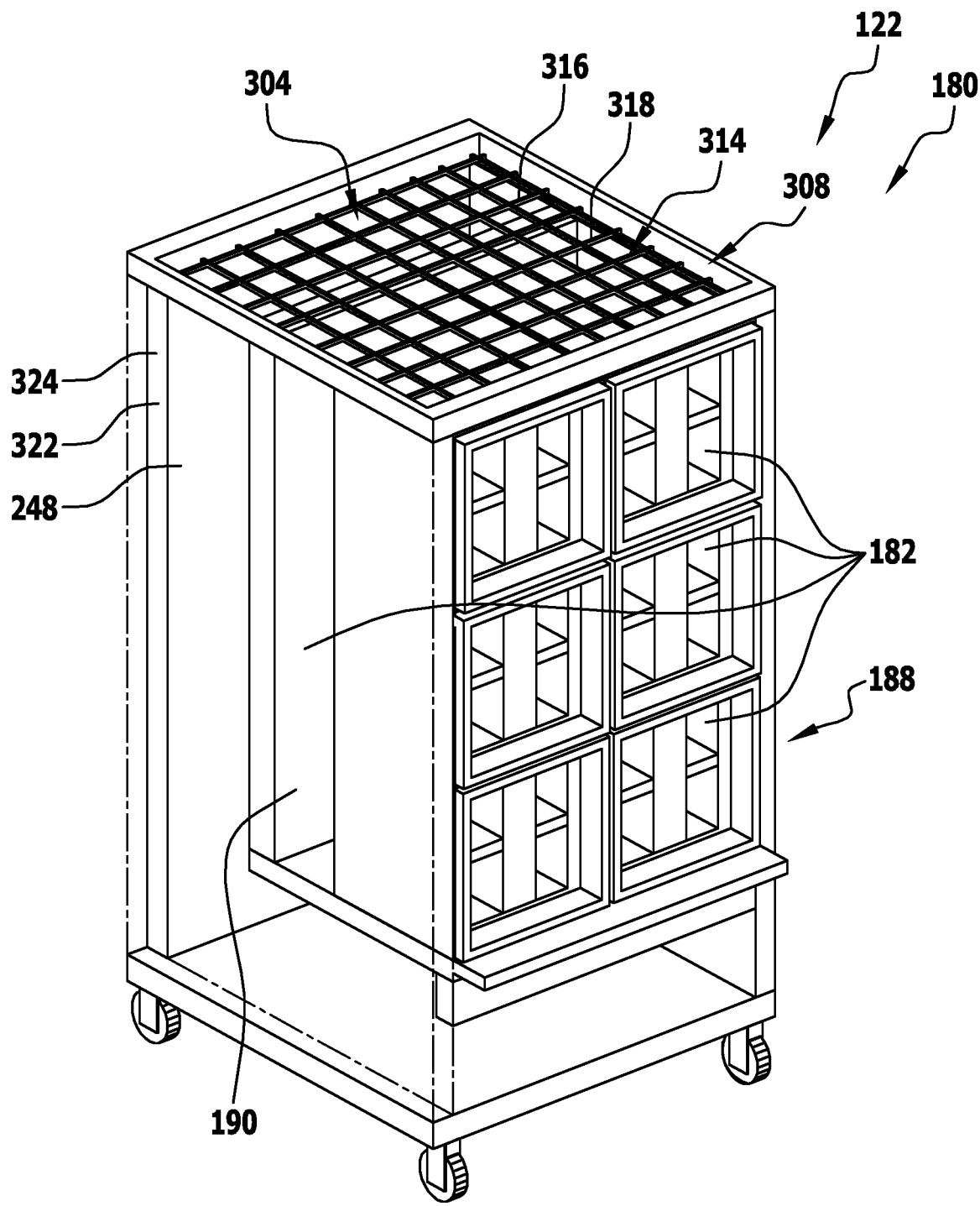
FIG. 17 shows a schematic perspective and partly transparent illustration of the filter module from FIG. 16.

A sixth embodiment of a painting system 100 that is illustrated in FIGS. 15 to 17 differs from the fifth embodiment which is illustrated in FIGS. 13 and 14 substantially in that the painting system 100, in particular the filter system 112, includes a fire protection device 300.

By means of the fire protection device 300, in particular a fire in the filter system 112 is preventable, containable and/or extinguishable.

In this arrangement, the fire protection device 300 includes one or more fire protection elements 302 for affecting the propagation of flames in the event of a fire.

In this arrangement, the fire protection elements 302 may on the one hand slow the propagation of fire, in particular if the fire protection elements 302 are formed from a fire-retardant material having a high fire resistance class.

However, in the sixth embodiment of the painting system 100, which is illustrated in FIGS. 15 to 17, the fire protection elements 302 are formed from a material which, under the effect of heat and/or in contact with a reagent, is disintegrable, liquefiable and/or combustible.

In particular, the material of the fire protection elements 302 is selected such that, in the event of a fire, the fire protection elements 302 can be removed or otherwise eliminated in order to clear an access opening or passage opening.

The access opening or passage opening then forms in particular an extinguishing opening 304 through which an interior space 248 of the filter modules 122 is accessible (see FIG. 17).

The fire protection device 300 further includes an application device 306 by means of which an extinguishing material and/or a reagent is dischargeable.

In the sixth embodiment of the painting system 100, which is illustrated in FIGS. 15 to 17, the application device 306 is arranged directly over the filter modules 122, with the result that the extinguishing material and/or reagent can be discharged from above onto a top wall 308 of the filter modules 122.

The application device 306 in particular takes the form of a sprinkler device 310, by means of which liquid, foam or powder extinguishing material and/or liquid, foam or powder reagent is dischargeable.

As can be seen in particular from FIG. 15, the application device 306 is arranged outside an untreated gas space 312 of the filter system 112 and outside the filter modules 122. As a result, undesired contamination of the application device 306 during normal operation (filter operation) of the filter system 112 can be prevented.

As can be seen in particular from FIGS. 16 and 17, the top wall 308 of each filter module 122 includes a receptacle 314 for receiving one or more fire protection elements 302.

In this arrangement, the receptacle 314 includes in particular a stabilisation device 316 for reliably and stably receiving and/or arranging the one or more fire protection elements 302.

The stabilisation device 316 for example takes the form of a grating 318 onto which the one or more fire protection elements 302 are placeable.

The sixth embodiment of a painting system 100, which is illustrated in FIGS. 15 to 17, in particular the fire protection device 300, functions as follows:

In the event of a fire in the filter system 112, a fire can be propagated within the filter system 112.

By means of fire protection elements 302 of the fire protection device 300, propagation of the fire, in particular the rate of propagation of the fire, can be affected in a targeted manner.

For example, by means of fire protection elements 302 that take the form of fire-retardant intermediate walls, the spread of fire from individual filter modules 122 to adjacent filter modules 122 can be prevented or at least slowed.

Moreover, by means of fire protection elements 302 which are formed from a material which, under the effect of heat and/or in contact with a reagent, is disintegrable, liquefiable and/or combustible, access to an interior space 248 of the filter modules 122 can be cleared in a targeted manner.

In particular, by removing the fire protection elements 302, one or more extinguishing openings 304 in a top wall 308 of the filter modules 122 can be cleared.

For this purpose, the fire protection elements 302 are for example formed from a fusible or combustible material. In particular, it may be provided for the fire protection elements 302 to be formed from cardboard and thus to burn in the event of a fire in order to clear the extinguishing openings 304.

As an alternative thereto, by means of the application device 306 it is possible to discharge a reagent onto the one or more fire protection elements 302 in order to cause the one or more fire protection elements 302 to disintegrate or to otherwise eliminate them. Also as a result of this, one or more extinguishing openings 304 in the top walls 308 of the filter modules 122 can be cleared.

Once the extinguishing openings 304 have been cleared, in particular an interior space 248 of the filter modules 122 is accessible, such that by means of the application device 306 extinguishing material can be introduced into the filter modules 122 through the extinguishing openings 304.

By means of the extinguishing material, it is then possible in particular to contain and extinguish the fire.

Otherwise, the sixth embodiment, illustrated in FIGS. 15 to 17, of a painting system 100 corresponds, as regards its structure and functioning, to the fifth embodiment illustrated in FIGS. 13 and 14, so in this respect reference is made to the description thereof above.

Figure 18:
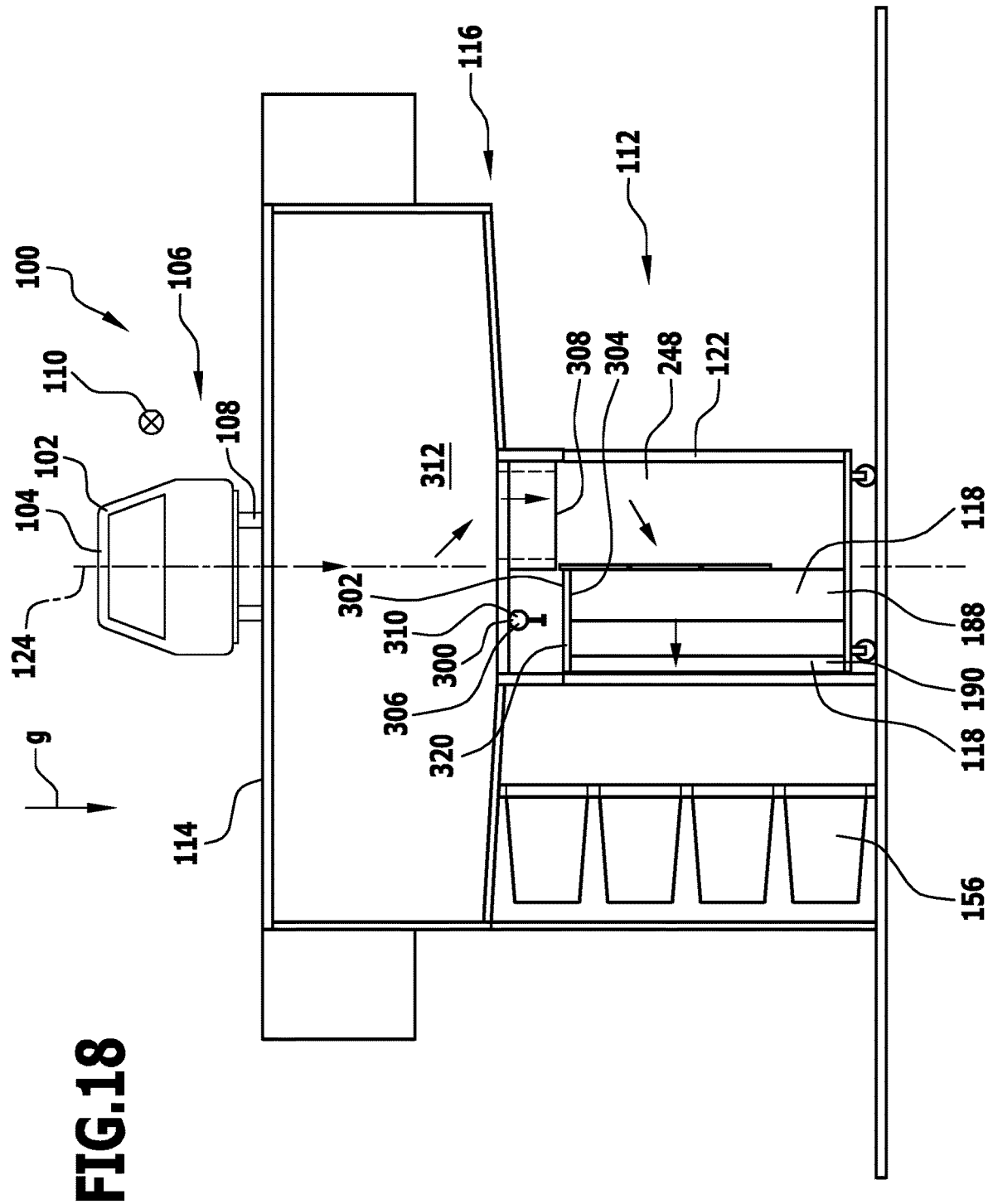
FIG. 18 shows a schematic sectional illustration, corresponding to FIG. 1, of a seventh embodiment of a painting system, in which there are provided filter modules which are arranged centrally and a fire protection device which is arranged directly over the filter modules.

A seventh embodiment of a painting system 100 that is illustrated in FIG. 18 differs from the sixth embodiment which is illustrated in FIGS. 15 to 17 substantially in that only a single row of centrally arranged filter modules 122 is provided. A construction of this kind is useful in particular if the quantity of overspray occurring in the paint spray booth 106 is relatively small.

In this seventh embodiment of the painting system 100, the stream of untreated gas flows substantially vertically from above, through the top wall 308 of the respective filter module 122 and into the respective filter module 122. Thereafter, the stream of untreated gas flows through two filter devices 118, namely a main filter device 188 and a post-filter device 190, which are a constituent part of the respective filter module 122.

Finally, the stream of gas flowing out of the filter modules 122 is guided through an additional filter device 156 and is finally guided away as a stream of clean gas.

A fire protection device 300 is also provided in the seventh embodiment of a painting system 100, which is illustrated in FIG. 18. This fire protection device 300 is in particular arranged directly over an intermediate wall 320 of the filter system 112.

In this arrangement, the intermediate wall 320 may be a constituent part of the top wall 308, in particular part of the top wall 308, of each filter module 122. However, it may also be provided for the intermediate wall 320 to be a constituent part of the base construction 116 of the filter system 112.

In particular, the intermediate wall 320 separates the region or interior space 248 of the respective filter module 122 in which the filter devices 118 are arranged from the region of the filter system 112 in which the application device 306 of the fire protection device 300 is arranged. In the seventh embodiment of the painting system 100 that is illustrated in FIG. 18, too, the application device 306 is thus preferably arranged outside a stream of gas, in particular outside the untreated gas space 312.

In the event of a fire, the fire protection element 302 that forms the intermediate wall 320 is removable in order to clear access to the interior space 248 of the filter modules 122.

In particular, it is thus possible to clear an extinguishing opening 304 of each filter module 122 by removing the fire protection element 302.

By means of the application device 306, extinguishing material is then dischargeable into the interior space 248 of the respective filter module 122, in particular in order to contain or extinguish a fire therein.

Otherwise, the seventh embodiment, illustrated in FIG. 18, of a painting system 100 corresponds, as regards its structure and functioning, to the sixth embodiment illustrated in FIGS. 15 to 17, so in this respect reference is made to the description thereof above.

Figure 19:
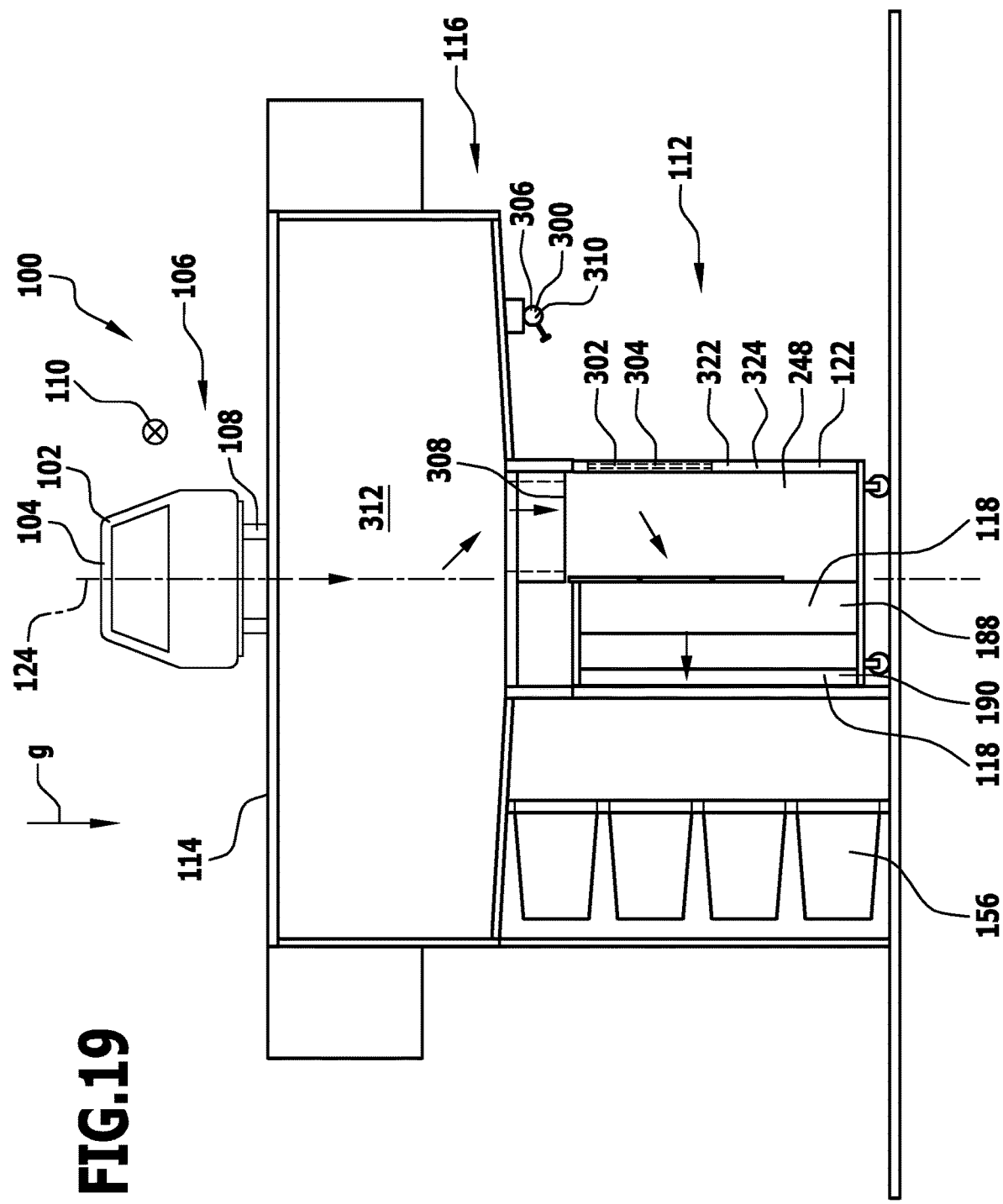
FIG. 19 shows a schematic sectional illustration, corresponding to FIG. 1, of an eighth embodiment of a painting system, in which there are provided filter modules which are arranged centrally and a fire protection device which is arranged laterally offset from the filter modules.

An eighth embodiment of a painting system 100 that is illustrated in FIG. 19 differs from the seventh embodiment which is illustrated in FIG. 18 substantially in that the application device 306 of the fire protection device 300 is arranged laterally offset above the filter modules 122.

In this arrangement, the application device 306 is arranged and oriented such that an extinguishing material and/or reagent can be discharged onto one or more side walls 322 of the filter modules 122.

In particular, extinguishing material and/or a reagent can be discharged onto one or more back walls 324 of one or more filter modules 122.

The extinguishing openings 304 that are initially covered by means of fire protection elements 302 and thus also the associated receptacles 314 are accordingly arranged on the side walls 322, in particular the back walls 324, of the filter modules 122.

Once the extinguishing openings 304 have been cleared by removing the fire protection elements 302, it is thus possible in particular to introduce extinguishing material laterally into the interior space 248 of the filter modules 122 in order to contain or extinguish a fire.

Otherwise, the eighth embodiment, illustrated in FIG. 19, of a painting system 100 corresponds, as regards its structure and functioning, to the seventh embodiment illustrated in FIG. 18, so in this respect reference is made to the description thereof above.

Figure 20:
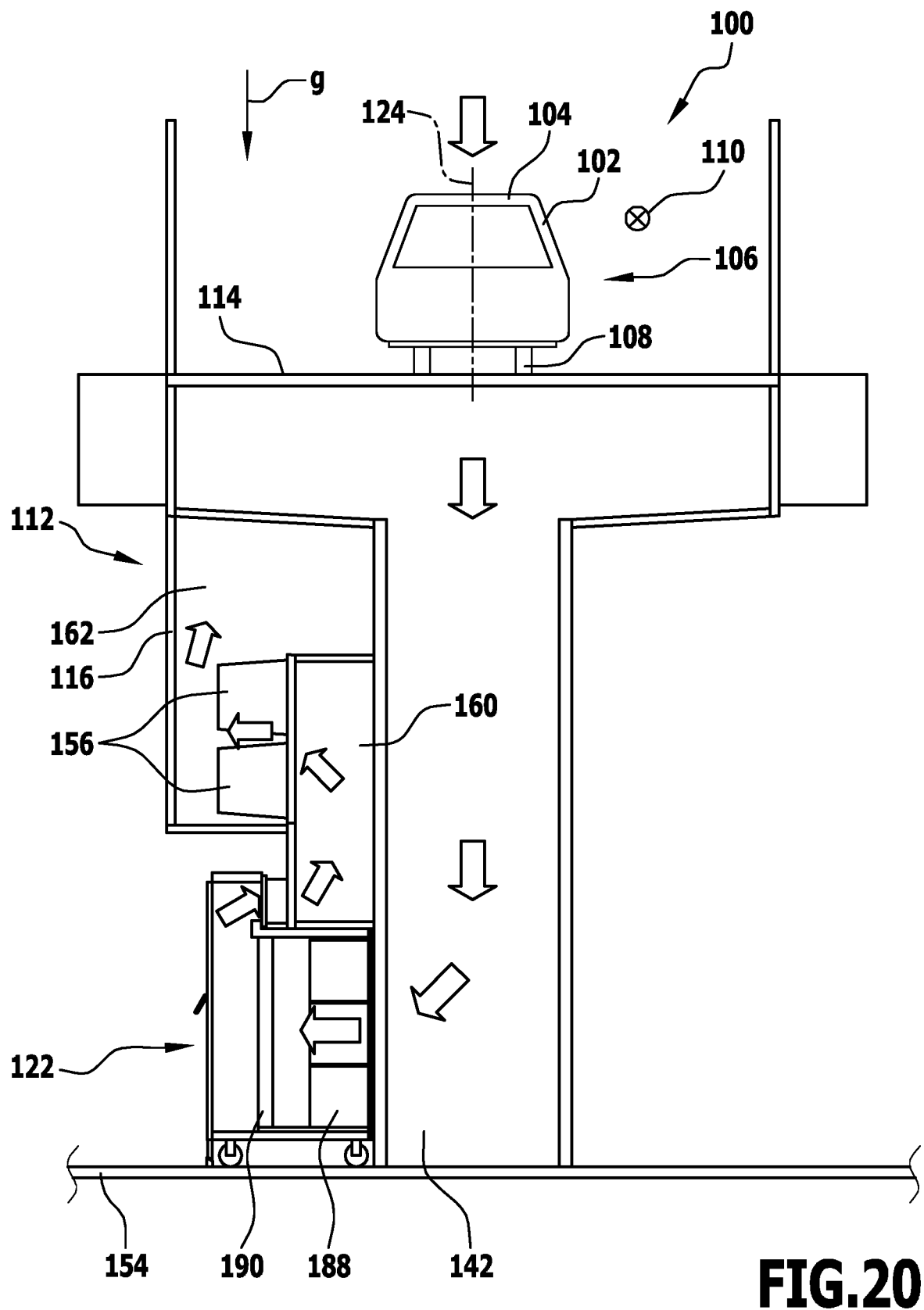
FIG. 20 shows a schematic sectional illustration, corresponding to FIG. 1, of a ninth embodiment of a painting system, in which a central untreated gas shaft and filter modules that are arranged on one side are provided, as is a collecting channel for clean gas that is arranged above the filter modules.

A ninth embodiment of a painting system 100 that is illustrated in FIG. 20 differs from the fifth embodiment which is illustrated in FIGS. 13 and 14 substantially in that the filter modules 122 are arranged rollably on the floor 154 on which the entire painting system 100 is constructed.

Preferably, all the filter modules 120 are arranged on the same side of the central untreated gas shaft 142.

The filter modules 120 preferably each include a main filter device 188 and a post-filter device 190.

A stream of clean gas that has been cleaned by means of the filter devices 188, 190 is guidable away out of the filter modules 122, above these filter devices 188, 190.

In particular, the stream of clean gas in the ninth embodiment, illustrated in FIG. 20, is feedable by way of a clean gas channel 160 to one or more additional filter devices 156.

The additional filter devices 156 are in particular arranged in stationary manner on the base construction 116 and preferably serve as a policing filter or additional filter, for preventing undesirable contamination of the clean gas side of the painting system 100.

The stream of clean gas that is guided through the additional filter devices 156 is feedable to the collecting channel 162, to which in particular clean gas from all the filter modules 122 is feedable.

Finally, the clean gas can be guided away out of the filter system 112 by means of the collecting channel 162 and fed for example to a point of re-use.

In the ninth embodiment of the painting system 100, in particular the filter system 112, illustrated in FIG. 20, the collecting channel 162 is arranged above the filter modules 122. In particular, the collecting channel 162 is arranged directly over the filter modules 122.

Thus, the collecting channel 162 and the filter modules 122 are arranged in succession in the vertical direction.

In this arrangement, a spacing, which may for example be bridged by means of one or more clean gas channels 160, may be provided between the collecting channel 162 and the filter modules 122. However, it may also be provided for the collecting channel 162 to directly adjoin the filter modules 122 in the vertical direction.

Otherwise, the ninth embodiment, illustrated in FIG. 20, of a painting system 100 corresponds, as regards its structure and functioning, to the fifth embodiment illustrated in FIGS. 13 and 14, so in this respect reference is made to the description thereof above.

Figure 21:
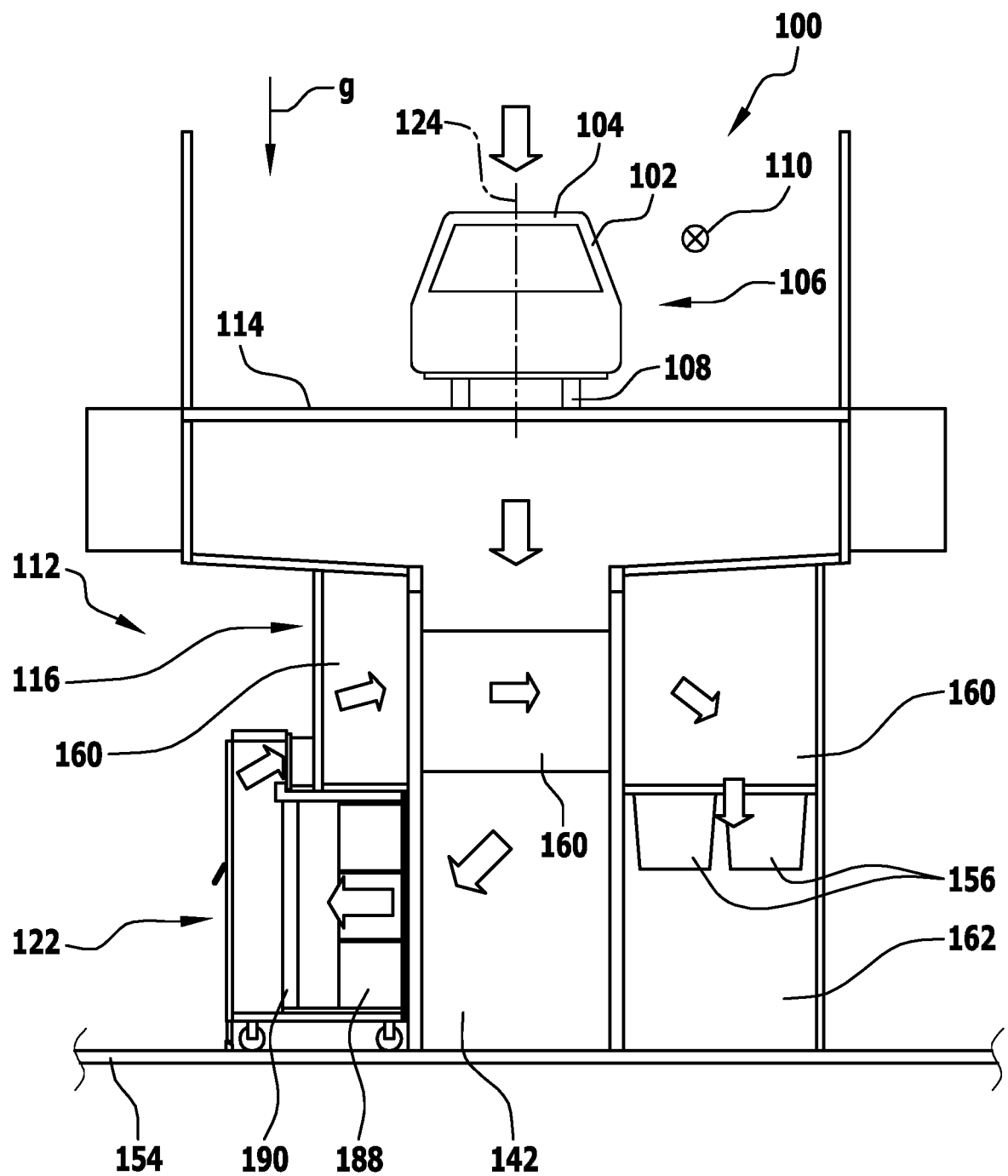
FIG. 21 shows a schematic sectional illustration, corresponding to FIG. 1, of a tenth embodiment of a painting system, in which a central untreated gas shaft and one or more clean gas channels that pass through the untreated gas shaft are provided.

A tenth embodiment of a painting system 100, in particular a filter system 112, that is illustrated in FIG. 21 differs from the ninth embodiment which is illustrated in FIG. 20 substantially in that the one or more clean gas channels 160 pass through the untreated gas shaft 142 and thus have untreated gas flowing around them during operation of the filter system 112.

In this arrangement, the filter modules 122 on the one hand and the collecting channel 162 on the other are arranged on mutually opposite sides of the central untreated gas shaft 142.

In particular, the collecting channel 162 is arranged substantially at the same level, in relation to the vertical direction (direction of gravity g), as the filter modules 122.

Otherwise, the tenth embodiment, illustrated in FIG. 21, of the painting system 100 corresponds, as regards its structure and functioning, to the ninth embodiment illustrated in FIG. 20, so in this respect reference is made to the description thereof above.

Individual features of different embodiments of filter modules 122 and/or filter module receptacles 120 will be explained below with reference to FIGS. 22 to 28.

These features may each be provided selectively individually or in combination with one another as an alternative or in addition to individual or a plurality of the features of the filter modules 122 or filter module receptacles 120 described above.

In the embodiment of the filter module 122 illustrated in FIG. 22, an immobilising device 400 is provided, by means of which the filter module 120 is immobilisable in a desired position, in particular a filter position on the filter module receptacle 120.

The immobilising device 400 includes in particular an immobilising element 402 that takes the form of a shoot bolt rod and is actuable by means of a handle 404 of the immobilising device 400. At its lower end, in relation to the direction of gravity g, the immobilising element 402 includes an oblique face 406 which is engageable with an oblique face 406 in a projection 408 on the floor 154.

In this arrangement, the oblique faces 406 are in particular oriented relative to one another such that the filter module 122 is pressed against the filter module receptacle 120 when the immobilising element 402 is actuated by means of the handle 404.

In the embodiment of a filter module 122 illustrated in FIG. 23, the oblique face 406 of the immobilising device 402 is engageable with an oblique face 406 in a recess 410 in the floor 154. On the basis of a recess 410 of this kind, it is possible in particular to avoid a projection 408 from the floor 154, which may be disruptive. From a functional point of view, however, the recess 410 substantially corresponds to the projection 408.

Figure 24:
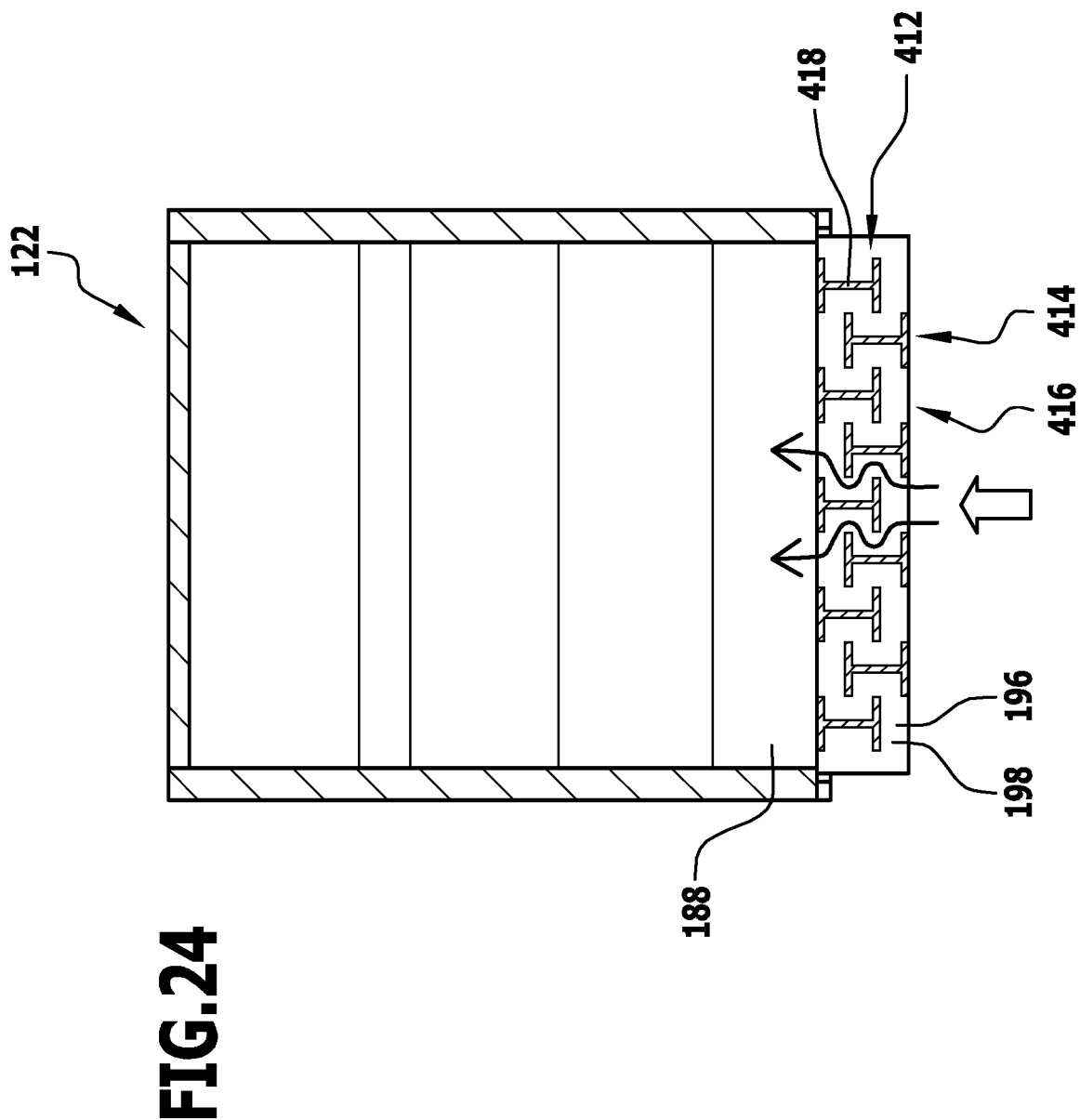
FIG. 24 shows a schematic horizontal section through a further alternative embodiment of a filter module, in which a pre-separating device is provided.

According to the alternative embodiment of a filter module 122 that is illustrated in FIG. 24, it may be provided for a filter module 122 to include a pre-separating device 412.

A pre-separating device 412 of this kind may in particular take the form of a labyrinth filter 414 or inertial filter 416.

In a pre-separating device 412 of this kind, preferably a single or multiple flow reversal or flow deflection takes place, such that in particular heavy contaminants cannot follow a stream of gas guided through the pre-separating device 412 but adhere to separating elements 418 of the pre-separating device 412 and are thus separated out of the stream of untreated gas.

In this arrangement, the separating elements 418 may have a substantially I-shaped or double T-shaped cross section.

Preferably, a plurality of separating elements 418 are arranged offset from one another and/or nested in one another, in particular in order to perform the single or multiple flow deflection.

The pre-separating device 412 is preferably arrangeable selectively and/or if necessary on a filter module 122.

For example, the pre-separating device 412 as a whole may be arranged upstream of a main filter device 188 of a filter module 122.

In this arrangement, the pre-separating device 412 preferably extends over the entire inlet surface of the main filter device 188.

Preferably, the pre-separating device 412 is arranged above, in particular directly over, a trough 198 of the filter module 122 that serves as a catching element 196.

In this way, liquid dripping down from the pre-separating device 412 can simply be caught and collected.

In the embodiment of a filter module 122 and an associated filter module receptacle 120 that is illustrated in FIGS. 25 to 28, an actuating device 420 by means of which the valve device 128 is actuable is provided.

Figure 26:
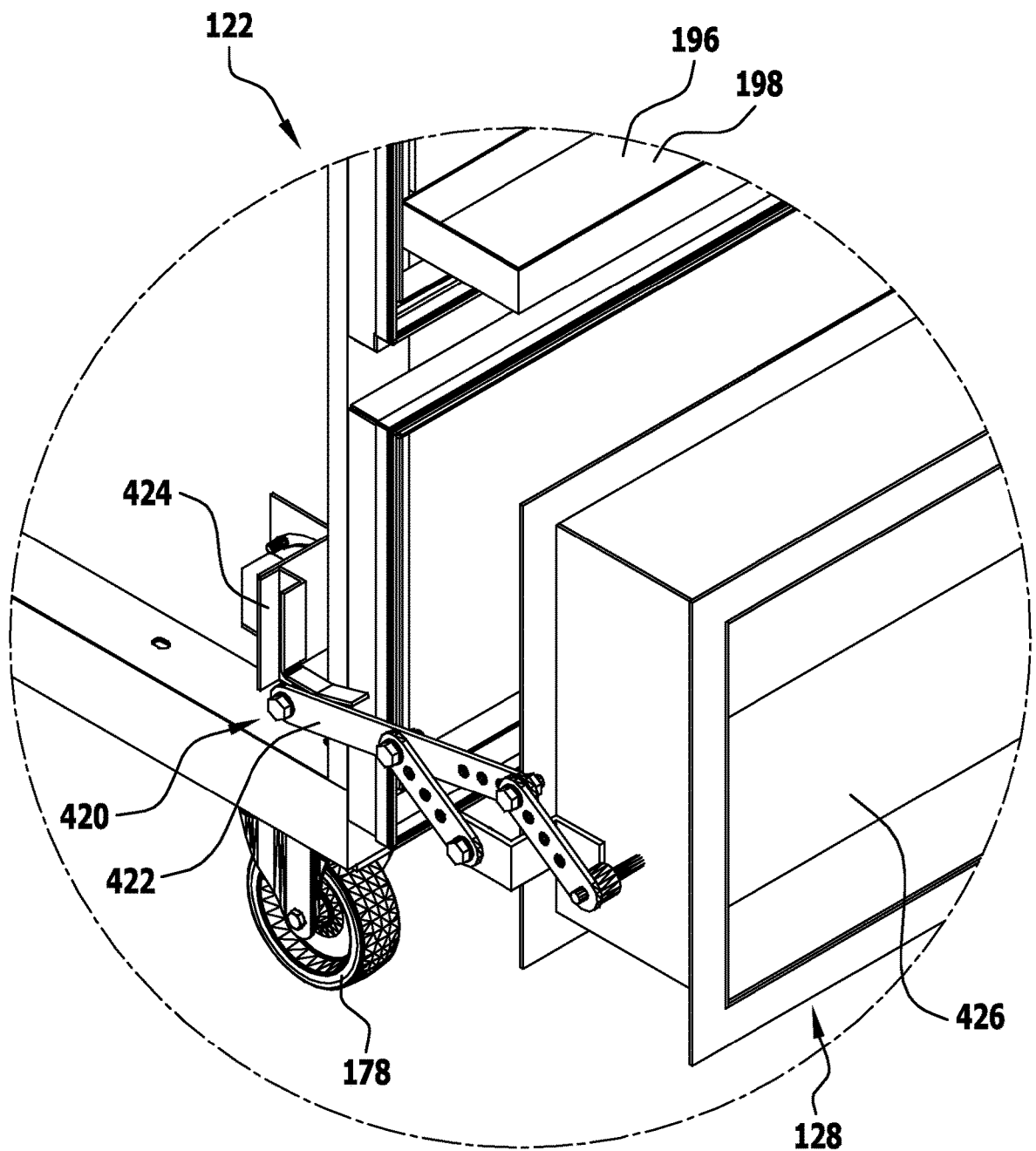
FIG. 26 shows an enlarged illustration of the region XXVI in FIG. 25.
Figure 27:
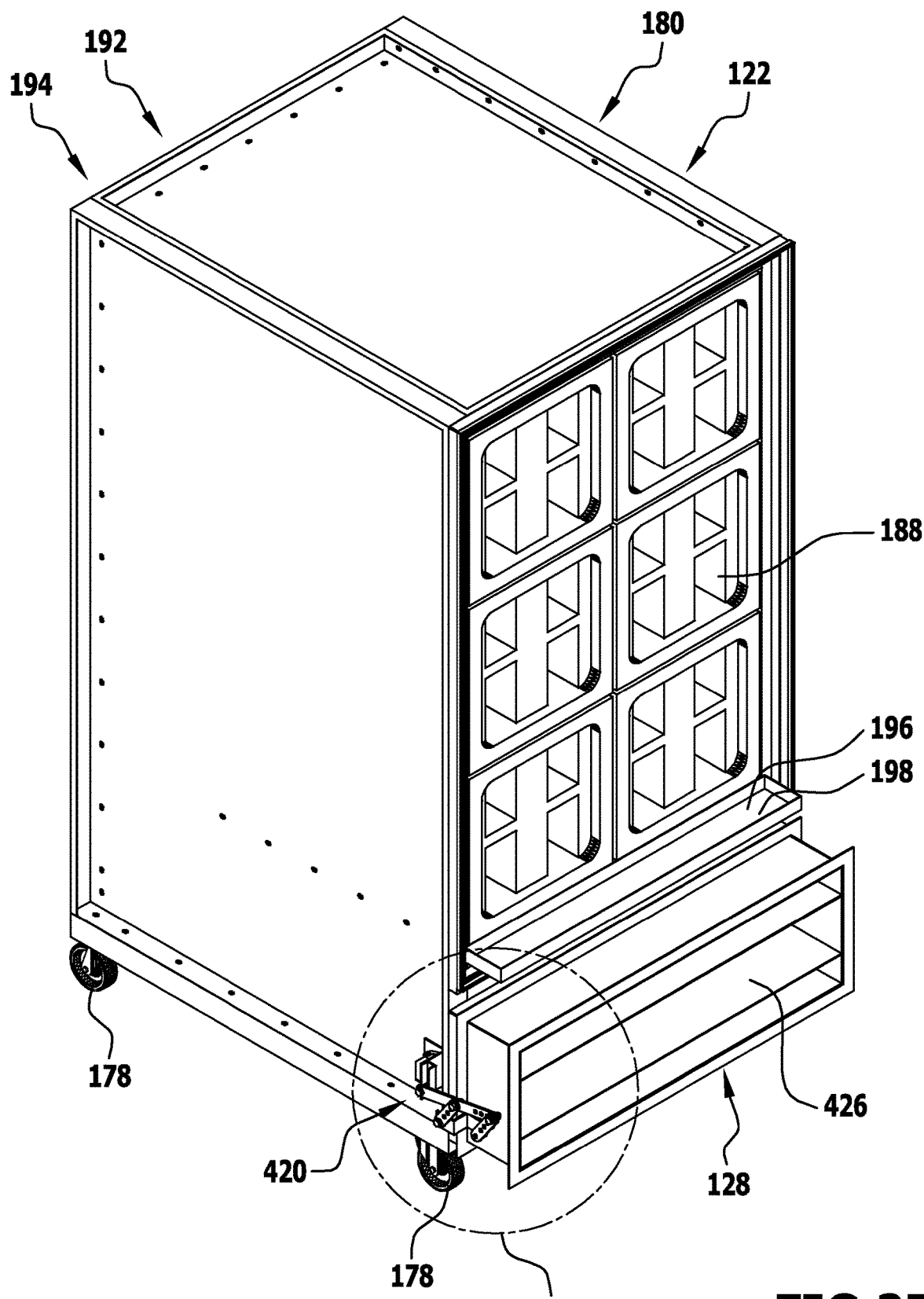
FIG. 27 shows a schematic perspective illustration, corresponding to FIG. 25, of the alternative embodiment of the filter module from FIG. 25, wherein the valve device is in an open position.
Figure 28:
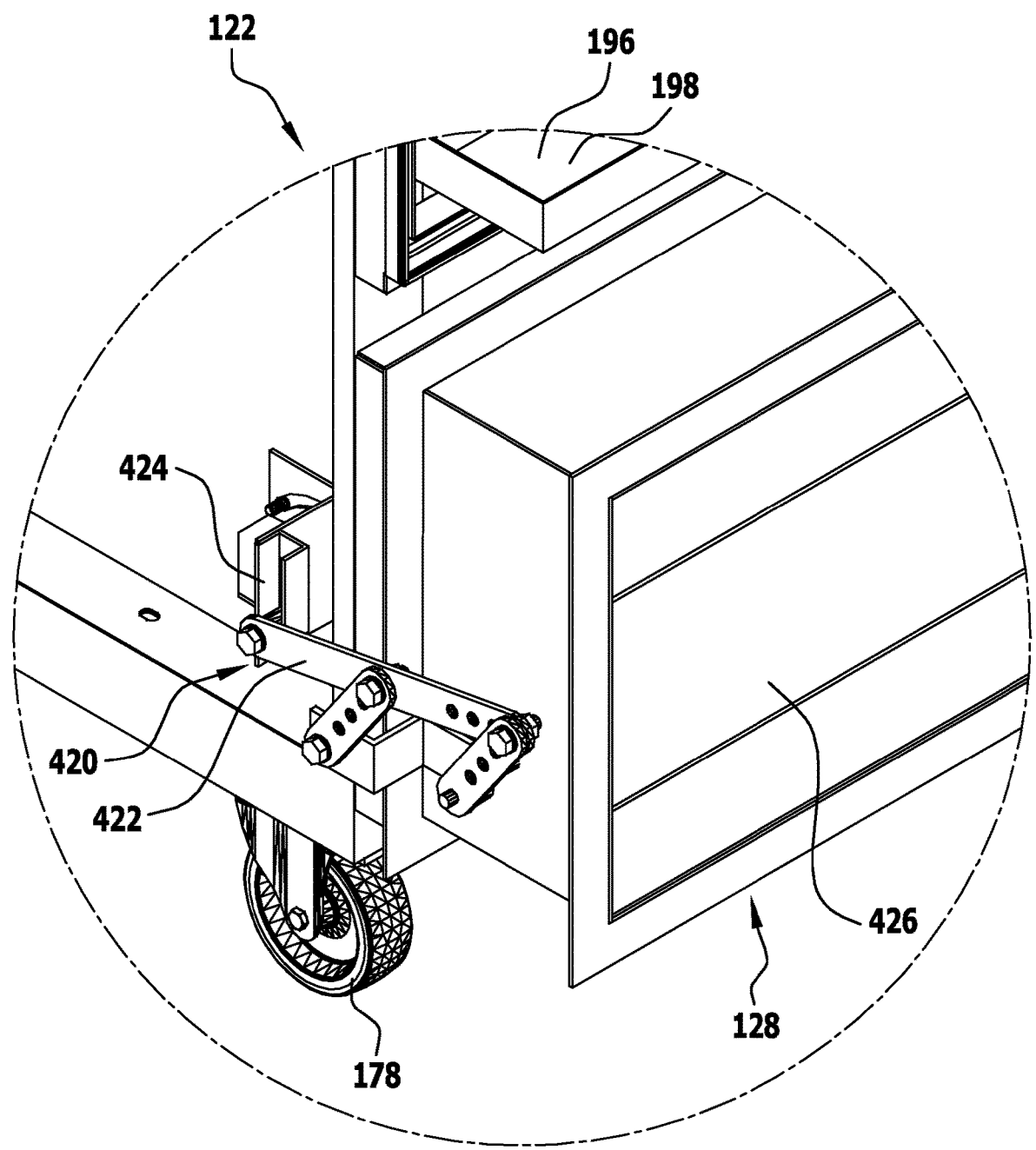
FIG. 28 shows an enlarged illustration of the region XXVIII in FIG. 27.

As is clear in particular from a comparison between FIGS. 26 and 28, the actuating device 420 is in particular mechanically actuable by pressing the filter module 122 against the valve device 128.

In this arrangement, the actuating device 420 in particular includes an actuating lever 422 which is engageable with a limit stop 424 of the actuating device 420 (see FIGS. 26 and 28).

The actuating lever 422 is in particular coupled to one or more flap elements 426 of the valve device 128 such that, by moving the actuating lever 422, the flap elements 426 are movable from an open position into a closed position or from a closed position into an open position.

Figure 25:
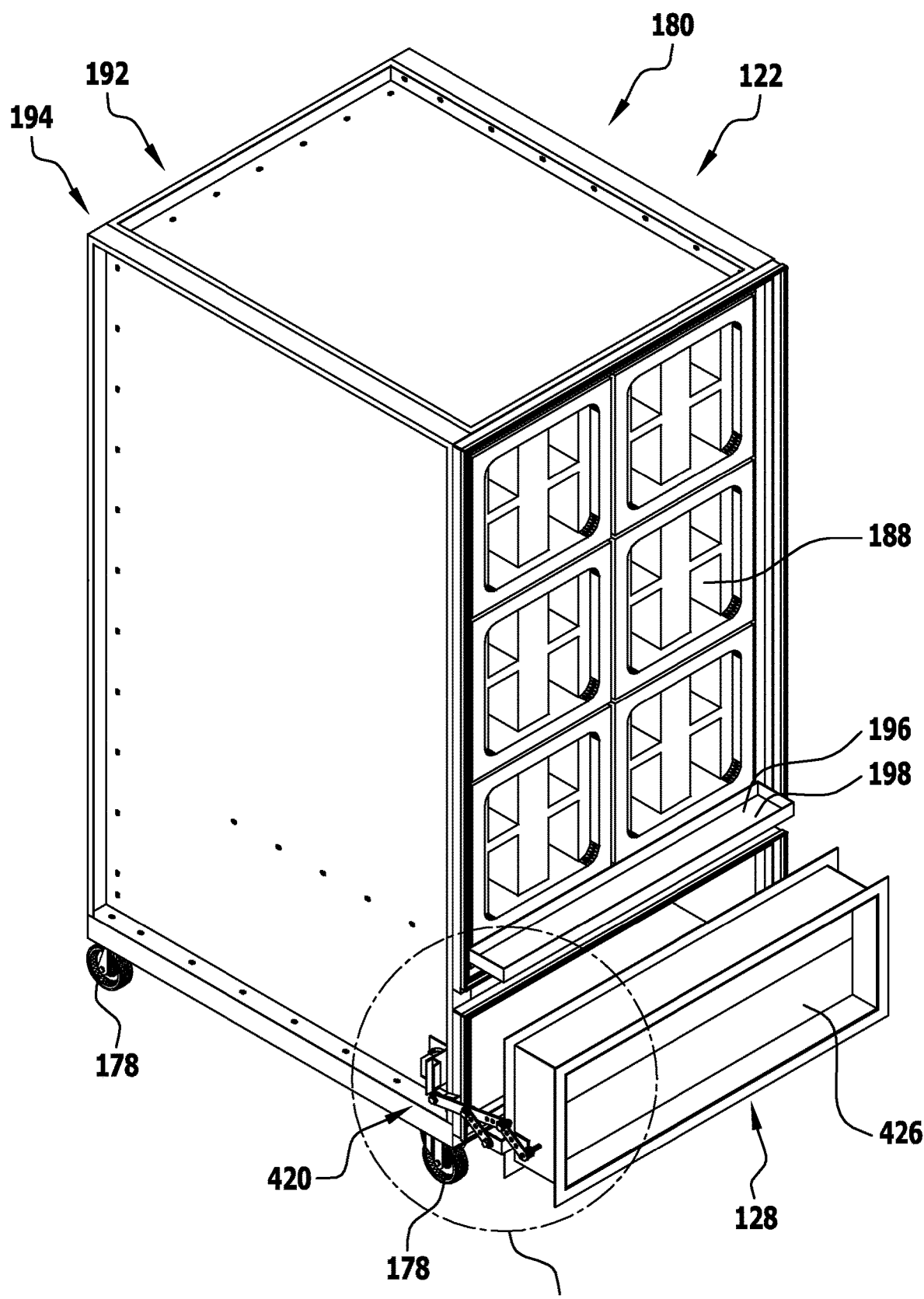
FIG. 25 shows a schematic perspective illustration of a further alternative embodiment of a filter module, in which an actuating device is provided for actuating a valve device, wherein the valve device is in a closed position.

The actuating lever 422 may for example be urged by a spring, such that the flap elements 426 are automatically moved into the closed position, illustrated in FIGS. 25 and 26, without the action of force on the actuating lever 422 by means of the limit stop 424.

In particular, the limit stop 424 of the actuating device 420 is a lateral projection of the filter module 122.

The actuating device 420 is in particular an actuating device 420 by means of which the valve device 128 is opened automatically when the filter module 122 is arranged in a predetermined position on a filter module receptacle 120. When the filter module 122 is removed from the filter module receptacle 120, the valve device 128 is preferably closed automatically.

Preferred embodiments are as follows:

1. A filter system (112) for separating off contaminants from a stream of untreated gas that contains contaminants, including a base construction (116) through which the stream of untreated gas is guidable and which includes at least one filter module receptacle (120) for receiving at least one filter module (122), and at least one filter module (122) which is selectively arrangeable on and/or in the at least one filter module receptacle (120) and/or removable therefrom, wherein the at least one filter module (122) includes a plurality of filter element receptacles (184) for receiving a plurality of mutually independent filter elements (182).

2. A filter system (112) according to embodiment 1, characterised in that a plurality of filter elements (182) are a constituent part of a filter device (118) of the filter module (122) and the stream of untreated gas that is to be cleaned is flowable through these in mutually parallel manner during a filter operation of the filter system (112).

3. A filter system (112) according to one of embodiments 1 or 2, characterised in that the at least one filter module (122) includes a plurality of filter devices (118) and the stream of untreated gas that is to be cleaned is flowable through these one after the other during a filter operation of the filter system (112).

4. A filter system (112) according to one of embodiments 1 to 3, characterised in that the at least one filter module (122) includes a pre-filter device (186), a main filter device (188) and/or a post-filter device (190), and at least a partial stream of the stream of untreated gas is flowable through these one after the other during a filter operation of the filter system (112).

5. A filter system (112) according to one of embodiments 1 to 4, characterised in that the at least one filter module (122) takes the form of a rollable and/or displaceable transport carriage (180).

6. A filter system (112) according to one of embodiments 1 to 5, characterised in that the at least one filter module (122) and/or the at least one filter module receptacle (120) includes a guide device (168) for guiding, moving and/or immobilising the at least one filter module (122) in relation to the at least one filter module receptacle (120).

7. A filter system (112) according to one of embodiments 1 to 6, characterised in that the base construction (116) includes at least one closable access opening (146) through which an interior space (126) of the at least one filter module receptacle (120) is accessible for introducing and/or removing the at least one filter module (122) from outside the filter system (112).

8. A filter system (112) according to one of embodiments 1 to 7, characterised in that the at least one filter module receptacle (120) includes at least one valve device (128) for selectively opening or closing an inlet opening (134) of the filter module receptacle (120), through which at least part of the stream of untreated gas is feedable to the filter module receptacle (120), and/or an outlet opening (144) of the filter module receptacle (120), through which a stream of gas is guidable away from the filter module receptacle (120).

9. A filter system (112) according to one of embodiments 1 to 8, characterised in that the filter system (112) includes a plurality of filter module receptacles (120) arranged opposite one another in relation to a vertical longitudinal centre plane (124) of the filter system (112), and/or a plurality of filter module receptacles (120) arranged successively in a longitudinal direction (110) of the filter system (112).

10. A filter system (112) according to one of embodiments 1 to 9, characterised in that the filter system (112) includes a plurality of filter module receptacles (120) that form flow channels (130) of the filter system (112) which are configured for mutually independent through flow, wherein individual or a plurality of flow channels (130) are blockable or clearable by means of valve devices (128) of the filter system (112).

11. A filter system (112) according to one of embodiments 1 to 10, characterised in that the filter system (112) includes at least one untreated gas shaft (142) that extends between at least two filter module receptacles (120) and through which the stream of untreated gas is guidable and is feedable to inlet openings (134) in the filter module receptacles (120).

12. A filter system (112) according to one of embodiments 1 to 11, characterised in that the filter system (112) includes at least one clean gas channel (160) that extends between at least two filter module receptacles (120) and through which a stream of clean gas, which is obtainable as a result of separating off contaminants from the stream of untreated gas, is guidable away.

13. A filter system (112) according to one of embodiments 1 to 12, characterised in that at least one filter module receptacle (120) is arranged on an outer wall (150) of the base construction (116) and/or is integrated in the outer wall (150) of the base construction (116), and in that at least one filter module (122) is arrangeable on the at least one filter module receptacle (120), by bringing the at least one filter module (122) into abutment against the outer wall (150).

14. A filter system (112) for separating off contaminants from a stream of untreated gas that contains contaminants, in particular according to one of embodiments 1 to 13, including at least one filter element receptacle (184) for receiving at least one filter element (182) and at least one change-over device (208) for automatically exchanging a more pronouncedly contaminated filter element (182) that is arranged in the at least one filter element receptacle (184) for a filter element (182) that is less pronouncedly contaminated.

15. A filter system (112) for separating off contaminants from a stream of untreated gas that contains contaminants, in particular according to one of embodiments 1 to 14, including:
a base construction (116) through which the stream of untreated gas is guidable; and
a fire protection device (300) by means of which a fire in the filter system (112) is preventable, containable and/or extinguishable, wherein the fire protection device (300) includes one or more fire protection elements (302) for affecting propagation of the flames.

16. A filter system (112) according to embodiment 15, characterised in that the fire protection device (300) includes one or more fire protection elements (302) that are actuable in the event of a fire.

17. A filter system (112) according to one of embodiments 15 or 16, characterised in that one or more fire protection elements (302) include a fire-retardant material or are formed from a fire-retardant material.

18. A filter system (112) according to one of embodiments 15 to 17, characterised in that one or more fire protection elements (302) include a material or are formed from a material which, under the effect of heat and/or in contact with a reagent, is disintegrable, liquefiable and/or combustible.

19. A filter system (112) according to embodiment 18, characterised in that the one or more fire protection elements (302) are arranged, in an initial position, on one or more receptacles (314) for one or more fire protection elements (302), and in that, by comparison with a material of the one or more receptacles (314), the material of the one or more fire protection elements (302) has a lower melting point, a lower fire resistance and/or a lower chemical stability and/or physical resistance.

20. A filter system (112) according to one of embodiments 15 to 19, characterised in that one or more extinguishing openings (304) in the filter system (112) are clearable in the event of a fire by means of one or more fire protection elements (302).

21. A filter system (112) according to embodiment 20, characterised in that the one or more extinguishing openings (304) of the filter system (112) are cutouts or apertures in one or more walls (308, 322, 324) of the filter system (112) that are closed in normal operation of the filter system (112) by means of one or more fire protection elements (302).

22. A filter system (112) according to one of embodiments 15 to 21, characterised in that the filter system (112) includes one or more filter elements (182) and/or one or more filter modules (122) whereof the interior space (248) is accessible from outside in the event of a fire, by removing one or more fire protection elements (302).

23. A filter system (112) according to one of embodiments 15 to 22, characterised in that the fire protection device (300) includes an application device (306) by means of which an extinguishing material and/or a reagent is dischargeable.

24. A filter system (112) according to embodiment 23, characterised in that an extinguishing material and/or a reagent are dischargeable by means of the application device (306) onto one or more fire protection elements (302).

25. A filter system (112) according to one of embodiments 23 or 24, characterised in that, in the event of a fire, extinguishing material and/or reagent are dischargeable by means of the application device (306) through one or more extinguishing openings (304) in the filter system (112) and into an interior space (142, 248) of the filter system (112).

26. A filter system (112) according to one of embodiments 23 to 25, characterised in that the application device (306) is arranged outside an interior space (142, 248) of the filter system (112), in particular outside an untreated gas space (312) of the filter system (112) and/or outside a clean gas space of the filter system (112).

27. A filter system (112) according to one of embodiments 15 to 26, characterised in that the filter system (112) includes one or more filter modules (122) that take the form of rollable or displaceable transport carriages (180), wherein a wall (308, 322, 324) of the one or more transport carriages (180) includes one or more extinguishing openings (304) which, in normal operation of the filter system (112), are closed by means of one or more fire protection elements (302).

28. A filter system (112) according to one of embodiments 1 to 27, characterised in that the filter system (112) includes one or more filter modules (122) and a collecting channel (162), to which a stream of clean gas obtainable by cleaning the stream of untreated gas is feedable from the one or more filter modules (122), wherein the collecting channel (162) is arranged above the one or more filter modules (122), in particular directly over the one or more filter modules (122).

29. A filter system (112) according to one of embodiments 1 to 28, characterised in that the filter system (112) includes one or more filter modules (122) that include a pre-separating device (412), wherein if necessary the pre-separating device (412) is arrangeable on the filter module (122), and/or wherein the pre-separating device (412) includes an inertial filter (416) or labyrinth filter (414).

30. A painting system (100) for painting workpieces (102), in particular vehicle bodies (104), including at least one filter system (112) according to one of embodiments 1 to 29.

31. A method for separating off contaminants from a stream of untreated gas that contains contaminants by means of a filter system (112), including:
feeding the stream of untreated gas to a plurality of filter elements (182) that are arranged in filter element receptacles (184) of a filter module (122), wherein the filter module (122) is arranged on and/or in a filter module receptacle (120) of the filter system (112);
separating off contaminants from the stream of untreated gas at the filter elements (182);
removing the filter module (122) from and/or out of the filter module receptacle (120);
exchanging one or more of the more pronouncedly contaminated filter elements (182) arranged in the filter element receptacles (184) for one or more less pronouncedly contaminated filter elements (182);
arranging the filter module (122) on and/or in the filter module receptacle (120).

32. A method for separating off contaminants from a stream of untreated gas that contains contaminants, in particular according to embodiment 31, including:
feeding the stream of untreated gas to at least one filter element (182);
separating off contaminants from the stream of untreated gas at the at least one filter element (182), as a result of which the at least one filter element (182) is contaminated;
exchanging the at least one contaminated filter element (182) for a fresh filter element (182) by means of an automatic change-over device (208).

33. A method for operating a filter system (112) for separating off contaminants from a stream of untreated gas that contains contaminants, in particular a filter system (112) according to one of embodiments 1 to 29, including:
activation of a fire protection device (300) for preventing, containing and/or extinguishing a fire in the filter system (112), wherein the propagation of flames is affected by means of one or more fire protection elements (302) of the fire protection device (300).

34. A method according to embodiment 33, characterised in that one or more extinguishing openings (304) in the filter system (112) are cleared in the event of a fire by means of one or more fire protection elements (302).

The invention claimed is:

1. A filter system for separating off contaminants from a stream of untreated gas that contains contaminants, including
a base construction through which the stream of untreated gas is guidable and which includes at least one filter module receptacle for receiving at least one filter module, and
at least one filter module which is selectively arrangeable on and/or in the at least one filter module receptacle and/or removable therefrom,
wherein the at least one filter module includes a plurality of filter element receptacles for receiving a plurality of mutually independent filter elements,
wherein at least one filter module receptacle is arranged on an outer wall of the base construction and/or is integrated in the outer wall of the base construction, and wherein at least one filter module is arrangeable on the at least one filter module receptacle, by bringing the at least one filter module into abutment against the outer wall,
wherein the at least one filter module receptacle and the at least one filter module each include an inlet opening and an outlet opening, such that both the inlet opening and the outlet opening of the at least one filter module are arranged on a front side of the filter module;

wherein both the inlet opening and the outlet opening of the at least one filter module receptacle extend through the outer wall on which the filter module receptacle is arranged; and wherein the outlet opening of the at least one filter module receptacle at least partially overlaps with the inlet opening of the at least one filter module and the inlet opening of the at least one filter module receptacle at least partially overlaps with the outlet opening of the at least one filter module so that the stream of untreated gas flows from the base construction into the at least one filter module, where it is treated, and then flows back out of the at least one filter module into the base construction as a stream of treated gas.

2. The filter system according to claim 1, wherein a plurality of filter elements are a constituent part of a filter device of the filter module and the stream of untreated gas that is to be cleaned is flowable through these in mutually parallel manner during a filter operation of the filter system.

3. The filter system according to claim 1, wherein the at least one filter module includes a plurality of filter devices and the stream of untreated gas that is to be cleaned is flowable through these one after the other during a filter operation of the filter system.

4. The filter system according to claim 1, wherein the at least one filter module includes a pre-filter device, a main filter device and/or a post-filter device, and at least a partial stream of the stream of untreated gas is flowable through these one after the other during a filter operation of the filter system.

5. The filter system according to claim 1, wherein the at least one filter module and/or the at least one filter module receptacle includes a guide device for guiding, moving and/or immobilising the at least one filter module in relation to the at least one filter module receptacle.

6. The filter system according to claim 1, wherein the base construction includes at least one closable access opening through which an interior space of the at least one filter module receptacle is accessible for introducing and/or removing the at least one filter module from outside the filter system.

7. The filter system according to claim 1, wherein the filter system includes a plurality of filter module receptacles arranged opposite one another in relation to a vertical longitudinal centre plane of the filter system, and/or a plurality of filter module receptacles arranged successively in a longitudinal direction of the filter system.

8. The filter system according to claim 1, wherein the filter system includes a plurality of filter module receptacles that form flow channels of the filter system which are configured for mutually independent through flow, wherein individual or a plurality of flow channels are blockable or clearable by means of valve devices of the filter system.

9. The filter system according to claim 1, wherein the filter system includes at least one untreated gas shaft that extends between at least two filter module receptacles and through which the stream of untreated gas is guidable and is feedable to inlet openings in the filter module receptacles.

10. The filter system according to claim 1, wherein the filter system includes at least one clean gas channel that extends between at least two filter module receptacles and through which a stream of clean gas, which is obtainable as a result of separating off contaminants from the stream of untreated gas, is guidable away.

11. The filter system according to claim 1, including at least one filter element receptacle for receiving at least one filter element and at least one change-over device for automatically exchanging a more pronouncedly contaminated filter element that is arranged in the at least one filter element receptacle for a filter element that is less pronouncedly contaminated.

12. The filter system according to claim 1, wherein the filter system includes one or more filter modules and a collecting channel, to which a stream of clean gas obtainable by cleaning the stream of untreated gas is feedable from the one or more filter modules, wherein the collecting channel is arranged above the one or more filter modules, in particular directly over the one or more filter modules.

13. The filter system according to claim 1, wherein the filter system includes one or more filter modules that include a pre-separating device, wherein if necessary the pre-separating device is arrangeable on the filter module, and/or wherein the pre-separating device includes an inertial filter or labyrinth filter.

14. A painting system for painting workpieces, in particular vehicle bodies, including at least one filter system according to claim 1.

15. A method for separating off contaminants from a stream of untreated gas that contains contaminants by means of a filter system, including:

feeding the stream of untreated gas to a plurality of filter elements that are arranged in filter element receptacles of a filter module, wherein the filter module is arranged on and/or in a filter module receptacle of the filter system, wherein the filter module receptacle is arranged on an outer wall of a base construction and/or is integrated in the outer wall of the base construction, and wherein the filter module is being arranged on the at least one filter module receptacle by bringing the filter module into abutment against the outer wall, the at least one filter module receptacle and the at least one filter module each include an inlet opening and an outlet opening, such that both the inlet opening and the outlet opening of the at least one filter module are arranged on a front side of the filter module; wherein both the inlet opening and the outlet opening of the at least one filter module receptacle extend through the outer wall on which the filter module receptacle is arranged, wherein the outlet opening of the at least one filter module receptacle at least partially overlaps with the inlet opening of the at least one filter module and the inlet opening of the at least one filter module receptacle at least partially overlaps with the outlet opening of the at least one filter module so that the stream of untreated gas flows from the base construction into the at least one filter module, where it is treated, and then flows back out of the at least one filter module into the base construction as a stream of treated gas;

separating off contaminants from the stream of untreated gas at the filter elements;

removing the filter module from and/or out of the filter module receptacle;

exchanging one or more of the more pronouncedly contaminated filter elements arranged in the filter element receptacles for one or more less pronouncedly contaminated filter elements;

arranging the filter module on and/or in the filter module receptacle.

16. The method for separating off contaminants from a stream of untreated gas that contains contaminants according to claim 15, including:
- feeding the stream of untreated gas to at least one filter element;
- separating off contaminants from the stream of untreated gas at the at least one filter element, as a result of which the at least one filter element is contaminated;
- exchanging the at least one contaminated filter element for a fresh filter element by means of an automatic change-over device.

* * * * *